US00RE49890E

(19) United States
(12) Reissued Patent
Lee et al.

(10) Patent Number: US RE49,890 E
(45) Date of Reissued Patent: Mar. 26, 2024

(54) METHOD AND APPARATUS FOR PROVIDING INFORMATION BY USING MESSENGER

(71) Applicant: Samsung Electronics Co., Ltd., Suwon-si (KR)

(72) Inventors: Hongju Lee, Seoul (KR); Sungpyo Yoon, Seongnam-si (KR)

(73) Assignee: Samsung Electronics Co., Ltd., Suwon-si (KR)

(21) Appl. No.: 16/748,210

(22) Filed: Jan. 21, 2020

Related U.S. Patent Documents

Reissue of:
(64) Patent No.: 10,171,398
Issued: Jan. 1, 2019
Appl. No.: 14/273,979
Filed: May 9, 2014

(30) Foreign Application Priority Data

May 21, 2013 (KR) ..... 10-2013-0056878

(51) Int. Cl.

| | |
|---|---|
| ***H04L 29/08*** | (2006.01) |
| ***G06F 3/0481*** | (2022.01) |
| ***G06F 40/169*** | (2020.01) |
| ***G06F 40/30*** | (2020.01) |
| ***H04L 51/216*** | (2022.01) |
| ***H04M 1/72436*** | (2021.01) |
| ***H04M 1/72454*** | (2021.01) |

(52) U.S. Cl.
CPC ..... *H04L 51/216* (2022.05); *G06F 3/0481* (2013.01); *G06F 40/169* (2020.01); *G06F 40/30* (2020.01); *H04M 1/72436* (2021.01); *H04M 1/72454* (2021.01)

(58) Field of Classification Search
CPC ..... G06F 40/30; G06F 40/169; G06F 3/0481; H04M 1/72436; H04L 51/16
See application file for complete search history.

(56) References Cited

U.S. PATENT DOCUMENTS 6,205,432 B1 * 3/2001 Gabbard ..... G06F 17/211 705/1.1
7,180,527 B2 * 2/2007 Sakai ..... G06F 17/214 345/629

(Continued)

FOREIGN PATENT DOCUMENTS

KR 10-1038087 B1 6/2011
KR 10-2012-0058659 A 6/2012

(Continued)

OTHER PUBLICATIONS

Korean Office Action dated Mar. 19, 2019, issued in Korean Patent Application No. 10-2013-0056878.

*Primary Examiner* — Minh Dieu Nguyen
(74) *Attorney, Agent, or Firm* — Jefferson IP Law, LLP

(57) ABSTRACT

A user device which can provide information related to text, which is input into a messenger, on a background screen of the messenger, and a method for providing information in the user device are provided. The method includes displaying a conversation exchanged through a messenger, detecting text related to a content in the conversation, displaying a content image matched to the content on a background of the conversation, and providing information related to the content in response to selection of the content image.

17 Claims, 19 Drawing Sheets

(56) References Cited

U.S. PATENT DOCUMENTS 9,042,923 B1* 5/2015 Mirho ..... H04W 4/14 455/412.1
2001/0040621 A1* 11/2001 Gerszberg ..... H04M 15/57 379/93.12
2003/0101450 A1* 5/2003 Davidsson ..... G06Q 10/10 725/32
2003/0185191 A1* 10/2003 Nagatomo ..... H04L 51/066 370/338
2005/0097463 A1* 5/2005 Yu ..... H04M 1/72544 715/246
2005/0156947 A1 7/2005 Sakai et al.
2008/0147501 A1* 6/2008 Gilliam ..... G06Q 10/107 705/14.66
2008/0162648 A1 7/2008 Leung
2009/0070103 A1* 3/2009 Beggelman ..... G06F 40/20 704/9
2009/0150158 A1* 6/2009 Becker ..... G06F 17/30265 704/270
2009/0215479 A1 8/2009 Karmarkar
2010/0248741 A1* 9/2010 Setlur ..... H04L 51/38 455/456.1
2010/0255865 A1 10/2010 Karmarkar
2011/0130123 A1 6/2011 Myaeng et al.
2011/0167445 A1* 7/2011 Reams ..... H04N 19/85 725/32
2012/0011454 A1* 1/2012 Droz ..... H04L 12/1827 715/758
2012/0157134 A1* 6/2012 Lee ..... H04L 12/583 455/466
2012/0290954 A1 11/2012 Qureshi et al.
2012/0303445 A1* 11/2012 Jablokov ..... G06Q 30/02 705/14.42
2013/0120429 A1 5/2013 Sukup
2014/0085334 A1* 3/2014 Payne ..... H04M 3/42382 345/633
2014/0100961 A1* 4/2014 Lee ..... G06Q 30/0267 705/14.64
2014/0136987 A1* 5/2014 Rodriguez ..... H04L 51/22 715/752
2014/0173460 A1* 6/2014 Kim ..... H04L 51/18 715/753
2014/0344712 A1* 11/2014 Okazawa ..... G06F 3/048 715/752
2016/0063748 A1* 3/2016 Kim ..... G06F 3/04817 715/778
2016/0127287 A1* 5/2016 Oh ..... H04L 12/1831 715/752
2016/0352887 A1* 12/2016 Na ..... H04M 1/72527

FOREIGN PATENT DOCUMENTS

KR 10-2012-0098368 A 9/2012
KR 10-1510144 B1 4/2015
WO 2010/110774 A2 9/2010

* cited by examiner

METHOD AND APPARATUS FOR PROVIDING INFORMATION BY USING MESSENGER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application claims the benefit under 35 U.S.C. § 119(a) of Korean patent application filed on May 21, 2013 in the Korean Intellectual Property Office and assigned Serial No. 10-2013-0056878, the entire disclosure of which is hereby incorporated by reference.

TECHNICAL FIELD

The present disclosure relates to a method and an apparatus for providing information by using a messenger. More particularly, the present disclosure relates to a method and an apparatus for providing information in a user device which can provide information related to text, which is input into a messenger, on a background screen of the messenger.

BACKGROUND

Recently, with the progress of digital technology, various user devices (e.g., a mobile communication terminal, a Personal Digital Assistant (PDA), an electronic organizer, a smart phone, a tablet Personal Computer (PC), etc.) capable of performing communication and processing personal information are being released. Such user devices do not remain in their respective traditional unique areas, but are reaching a mobile convergence phase covering areas of other terminals. For example, a user device can have various functions, including call functions such as a voice call, a video call, etc., message transmission/reception functions such as a Short Message Service (SMS), a Multimedia Messaging Service (MMS), e-mail, etc., a navigation function, an image capturing function, a broadcast reproduction function, a media (e.g., a moving image and music) reproduction function, an Internet function, a messenger function, a Social Network Service (SNS) function, and the like.

Recently, based on advances of a wireless communication function of the user device, the user device supports a chatting service using a messenger. Accordingly, a user of the user device can converse (or chat) with at least one particular counterpart by designating the at least one particular counterpart as a conversation partner by using a messenger in the user device. Such a chatting service using the messenger is becoming widely used, due to its convenience and because its enables the user to converse with the conversation partner in real time. Therefore, research and development have recently been made on the user devices so as to provide various additional services in view of the users' interests and the like in the messengers. For example, when the user chats with the conversation partner through the messenger, the user device provides support so as to enable the user to set the size and color of text, so as to enable the user to set a background screen of a chat window for each conversation group.

The above information is presented as background information only to assist with an understanding of the present disclosure. No determination has been made, and no assertion is made, as to whether any of the above might be applicable as prior art with regard to the present disclosure.

SUMMARY

Aspects of the present disclsoure are to address at least the above-mentioned problems and/or disadvantages and to provide at least the advantages described below. Accordingly, an aspect of the present disclsoure is to provide a method and an apparatus for providing information by using a messenger, which can provide a user with various pieces of information through the messenger of a user device.

In various embodiments of the present disclsoure, examples of the user device may include all types of electronic apparatuses, which use an Application Processor (AP), a Graphics Processing Unit (GPU) and a Central Processing Unit (CPU), such as all types of information communication devices, all types of multimedia devices, and application devices for all types of the information communication devices and all types of the multimedia devices, which support functions according to the various embodiments of the present disclsoure.

Another aspect of the present disclsoure is to provide a method and an apparatus for providing information by using a messenger which, in a user device, can analyze text which is input into the messenger, can extract a content image related to the text, and can provide the extracted content image as a background of the messenger.

Still another aspect of the present disclsoure is to provide a method and an apparatus for providing information by using a messenger which, in a user device, can display a content image related to text which has been input into the messenger, can execute a function related to the relevant content image in response to the selection of the content image by the user, and thereby can provide useful information to the user.

Yet another aspect of the present disclsoure is to provide a method and an apparatus for providing information by using a messenger which can display a content image matched to text, which has been input into the messenger, so as to be overlapped with a basic background screen which is set for the messenger.

Still another aspect of the present disclsoure is to provide a method and an apparatus for providing information by using a messenger, by which a text extraction rule related to the display of a content image, a scheme for exposing a content image, and a scheme for reading and displaying the previous information can be defined in the messenger according to a user's setting.

Further another aspect of the present disclsoure is to provide a method and an apparatus for providing information by using a messenger which can create an optimal environment for providing a user with useful and convenient recommendation information in a user device and can improve the convenience of the user and the usability of the user device.

In accordance with an aspect of the present disclsoure, a method for providing information in a user device is provided. The method includes displaying a conversation exchanged through a messenger, detecting text related to a content in the conversation, displaying a content image matched to the content on a background of the conversation, and providing information related to the content in response to selection of the content image.

In accordance with another aspect of the present disclsoure, a computer-readable recording medium recording a program for executing the method in a processor is provided.

In accordance with another aspect of the present disclsoure, a computer-readable recording medium storing a program is provided. The program performs displaying a conversation exchanged through a messenger, detecting text related to a content in the conversation, displaying a content image matched to the content on a background of the messenger, and providing information related to the content in response to selection of the content image.

In accordance with still another aspect of the present disclsoure, an apparatus for providing information in a user device is provided. The apparatus includes a touch screen configured to display a conversation exchanged through a messenger and a content image related to a content, and to receive an input corresponding to selection of the content image in a state of displaying the content image, and a control unit configured to recognize the content in the exchanged conversation, to perform a control operation for displaying the content image matched to the content on a background of the messenger, and to perform a control operation for displaying information related to the content in response to the selection of the content image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
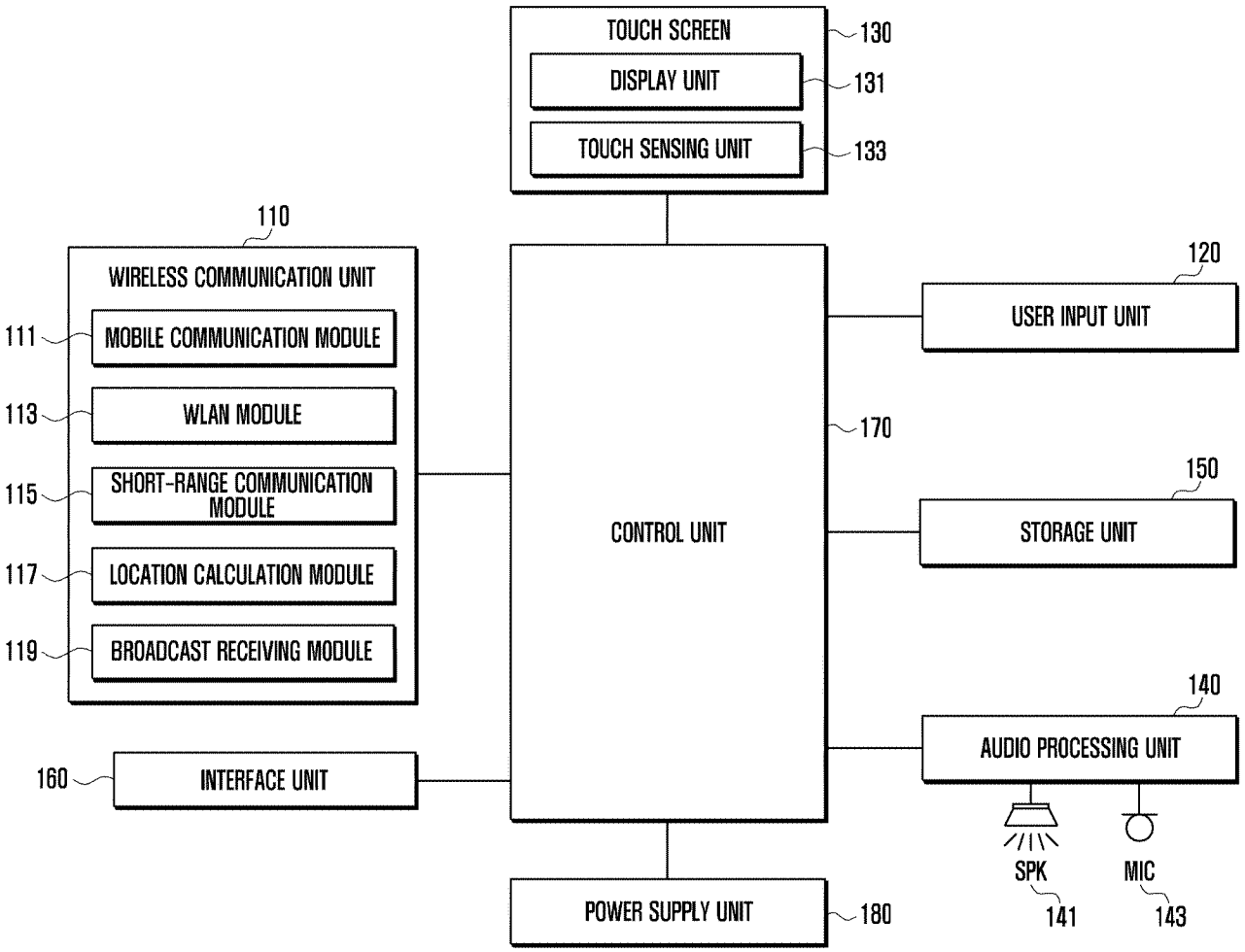
FIG. 1 is a block diagram schematically illustrating a configuration of a user device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a user device capable of displaying information related to a conversation, which is input into a messenger, as a background screen (e.g., a background screen of the conversation) of the messenger and a method for providing information in the user device. According to various embodiments of the present disclosure, text related to particular content may be detected from a conversation that a user exchanges with at least one other user through the messenger, various contents (e.g., information and an advertisement) related to the detected text may be provided in the form of a background in a conversation window. According to an embodiment of the present disclosure, the user device may analyze text of a conversation exchanged through the messenger, and may extract a content image related to the analyzed text. Then, the user device may display the extracted content image on the background of the messenger and may execute a function associated with the relevant content image in response to the user's selection to the content image displayed as the background, thereby providing useful information to the user.

Hereinafter, a configuration of a user device according to various embodiments of the present disclsoure and an operation control method thereof will be described with reference to the accompanying drawings. The configuration of the user device according to the various embodiments of the present disclsoure and the operation control method thereof are not limited to or restricted by the various embodiments described below. Accordingly, it should be noted that the configuration of the user device and the operation control method thereof may be applied to various embodiments based on the following various embodiments.

FIG. 1 is a block diagram schematically illustrating a configuration of a user device according to an embodiment of the present disclosure.

Referring to FIG. 1, the user device includes a wireless communication unit 110, a user input unit 120, a touch screen 130, an audio processing unit 140, a storage unit 150, an interface unit 160, a control unit 170, and a power supply unit 180. In an embodiment of the present disclsoure, a user device does not include the elements illustrated in FIG. 1 as essential ones. Accordingly, a user device may be implemented so as to include more elements than those illustrated in FIG. 1, or may be implemented so as to include fewer elements than those illustrated in FIG. 1. For example, when supporting an image capturing function, a user device according to an embodiment of the present disclsoure may further include a camera module. In contrast, when a user device according to an embodiment of the present disclsoure does not support a broadcast reception and reproduction function, a certain module (e.g., a broadcast receiving module 119 of the wireless communication unit 110) may be omitted from the user device.

The wireless communication unit 110 may include one or more modules which enable wireless communication between the user device and a wireless communication system or between the user device and another user device. For example, the wireless communication unit 110 may include a mobile communication module 111, a Wireless Local Area Network (WLAN) module 113, a short-range communication module 115, a location calculation module 117, a broadcast receiving module 119, and the like.

The mobile communication module 111 transmits and receives wireless signals to/from at least one of a base station, an external terminal, and various servers (e.g., an integration server, a provider server, a content server, an Internet server, a cloud server, etc.) through a mobile communication network. Examples of the wireless signal may include a voice call signal, a video call signal, and data in various forms according to the transmission and reception of text/multimedia messages. The mobile communication module 111 may transmit data (e.g., text, an emoticon, and a file such as an image, a moving image or the like) that the user has input into a messenger, or may receive data from the outside. Also, the mobile communication module 111 may be connected to a server matched to a content image displayed as a background of the messenger, and may receive relevant information.

The WLAN module 113 enables the user device to connect to a wireless Internet, and forms a WLAN link between the user device and another user device. The WLAN module 113 may be mounted inside or outside the user device. Use may be made of Wireless Internet technologies, such as WLAN (Wi-Fi), Wireless broadband (Wibro), World Interoperability for Microwave Access (Wimax), High Speed Downlink Packet Access (HSDPA), and the like. The WLAN module 113 may transmit data that the user has input into the messenger, or may receive data from the outside. Also, the WLAN module 113 may be connected to a server matched to a content image displayed as the background of the messenger, and may receive relevant information. Further, when a WLAN link is formed between the user device and another user device, the WLAN module 113 may transmit various data (e.g., an image, a moving image, music, etc.) according to the user's selection to another user device, or may receive various data (e.g., an image, a moving image, music, etc.) according to another user's selection from another user device. The WLAN module 113 may maintain a normal on state, or may be turned on according to the user's setting or the user's input.

The short-range communication module 115 is used for short-range communication. Use may be made of short-range communication technologies, such as Bluetooth, Bluetooth Low Energy (BLE), Radio Frequency Identification (RFID), Infrared Data Association (IrDA), Ultra Wideband (UWB), ZigBee, Near Field Communication (NFC), and the like. When the user device is connected to another user device through short-range communication, the short-range communication module 115 may transmit various data (e.g., an image, a moving image, music, etc.) according to the user's selection to another user device, or may receive various data (e.g., an image, a moving image, music, etc.) according to another user's selection from another user device. The short-range communication module 115 may maintain a normal on state, or may be turned on according to the user's setting or the user's input.

The location calculation module 117 is used to acquire a location of the user device, and may include a Global Positioning System (GPS) module in a typical example. The location calculation module 117 calculates information on a distance between the user device and each of three or more base stations and information on an accurate time point at which the distance information has been measured, applies trigonometry to the calculated distance information and time information, and thereby may calculate Three-Dimensional (3D) current location information according to latitude, longitude and altitude. Alternatively, the location calculation module 117 continuously receives, in real time, location information of the user device from each of three or more satellites, and thereby may calculate current location information. The location information of the user device may be acquired by using various methods.

The broadcast receiving module 119 receives broadcast signals (e.g., a TV broadcast signal, a radio broadcast signal, a data broadcast signal, etc.) and/or broadcast-related information (e.g., information related to a broadcast channel, a broadcast program, a broadcast service provider or the like) from an external broadcast management server via a broadcast channel (e.g., a satellite broadcast channel, a terrestrial broadcast channel, etc.).

The user input unit 120 may generate input data for controlling an operation of the user device, in response to a user input. The user input unit 120 may include a keypad, a dome switch, a touch pad (static pressure/capacitance), a jog wheel, a jog switch, a sensor (e.g., a voice recognition sensor, a proximity sensor, an illuminance sensor, an acceleration sensor, a gyro sensor, etc.), and the like. Also, the input unit 120 may be implemented in the form of buttons on an outer surface of the user device, and some buttons may be implemented by using a touch panel. The user input unit 120 may receive a user input for executing the messenger, and may generate an input signal according to the received user input. The user input unit 120 may receive a user input for inputting (i.e., attaching) various data (e.g., text, an emoticon, a file, etc.) matched to a conversation in the messenger, and may generate an input signal according to the received user input. Also, the user input unit 120 may receive a user input for selecting a content image displayed as a background in the messenger, and may generate an input signal according to the received user input.

The touch screen 130 is an input means which simultaneously performs an input function and a display function, and may include a display unit 131 and a touch sensing unit 133. For example, the touch screen 130 may display various screens (e.g., a screen according to the operation of the messenger, a screen for call origination, a game screen, a gallery screen, etc.) according to the operation of the user device through display unit 131. When the touch sensing unit 133 receives an input corresponding to a touch event from the user while the display unit 131 displays a particular screen, the touch screen 130 may deliver an input signal according to the touch event, to the control unit 170. Then, the control unit 170 may distinguish the touch event from another touch event, and may control the execution of an operation according to the touch event.

According to an embodiment of the present disclosure, the touch screen 130 may receive a touch event for the input of text by the user while displaying a conversation screen according to the operation of the messenger, and may display the relevant text on the conversation screen of the messenger displayed through the display unit 131, according to the control of the control unit 170. Then, the touch screen 130 may display a content image related to content detected from the text as a background of the messenger according to the control of the control unit 170, may receive a touch event for selection of the content image by the user while displaying the content image, and may display a screen executed in relation to the relevant content image according to the control of the control unit 170.

The display unit 131 may display (i.e., output) information processed by the user device. For example, when the user device is in a call mode, the display unit 131 displays a User Interface (UI) or a Graphical UI (GUI) related to a call. When the user device is in a video call mode or in an image capturing mode, the display unit 131 displays a captured and/or received image, a UI, or a GUI. For example, in an embodiment of the present disclsoure, the display unit 131 may display an execution screen of the messenger, and may display data received as input from the user and data received from the outside in the messenger, namely, data exchanged between users for a conversation, by using a set UI or GUI. Also, the display unit 131 may display a content image related to particular content detected from text as a background of the messenger while displaying an execution screen of the messenger, and may display an execution screen of a function (or an application) executed in relation to the content image. Further, the display unit 131 may support the display of screen switching depending on a change between the display of a screen in a landscape mode and that of a screen in a portrait mode, according to a rotation direction (or a placement direction) of the user device. Examples of a screen of the display unit 131 which are operated according to various embodiments of the present disclsoure will be described below.

The display unit 131 may include at least one of a Liquid Crystal Display (LCD), a Thin Film Transistor-LCD (TFT LCD), a Light Emitting Diode (LED) display, an Organic LED (OLED) display, an Active Matrix OLED (AMOLED) display, a flexible display, a bended display, a 3D display, and the like. Some of these displays may be transparent displays implemented so as to be transparent or light-transparent in order to enable the user to see the outside through the display.

The touch sensing unit 133 may be placed on the display unit 131, and may sense a touch event by the user which contacts the surface of the touch screen 130. Examples of the touch event may include a tap, a drag, a sweep, a flick, a drag and drop, a drawing, a single touch, a multi-touch, a gesture (e.g., writing, etc.), and hovering. When sensing a touch event by the user on the surface of the touch screen 130, the touch sensing unit 133 may detect coordinates at which the touch event has been generated, and may deliver the detected coordinates to the control unit 170. For example, the touch sensing unit 133 may sense the touch event generated by the user, may generate a signal according to the sensed touch event, and may deliver the generated signal to the control unit 170. The control unit 170 may perform a function corresponding to an area, in which the touch event has been generated, in response to the signal delivered by the touch sensing unit 133.

The touch sensing unit 133 may receive, as input, a touch event for executing the messenger, and may generate an input signal according to the received touch event. The touch sensing unit 133 may receive, as input, a touch event for inputting (i.e., attaching) various data (e.g., text, an emoticon, a file, etc.) matched to a conversation in the messenger, and may generate an input signal according to the received touch event. Also, the touch sensing unit 133 may receive, as input, a touch event for selecting a content image displayed as a background in the messenger, and may generate an input signal according to the received touch event.

The touch sensing unit 133 may be configured to convert a pressure applied to a particular part of the display unit 131 or a change in capacitance generated at the particular part thereof, into an electrical input signal. The touch sensing unit 133 may be configured to be capable of detecting not only a touched position and a touched area but also even a pressure during a touch according to an applied touch scheme. When a touch input is provided to the touch sensing unit 133, a signal (or signals) matched to the touch input may be delivered to a touch controller (not illustrated). The touch controller may process the signal (or signals), and may deliver relevant data to the control unit 170. Accordingly, the control unit 170 may determine which area of the touch screen 130 has been touched.

The audio processing unit 140 may deliver an audio signal, which has been received as input from the control unit 170, to a Speaker (SPK) 141, and may deliver an audio signal such as a voice and the like, which has been received as input from a Microphone (MIC) 143, to the control unit 170. According to the control of the control unit 170, the audio processing unit 140 may convert voice/sound data into an audible sound and may output the audible sound, through the SPK 141. The audio processing unit 140 may convert an audio signal, such as a voice and the like, which has been received from the MIC 143, into a digital signal, and may deliver the digital signal to the control unit 170.

The SPK 141 may output audio data, which has been received from the wireless communication unit 110 or is stored in the storage unit 150, in a messenger mode, a call mode, a message mode, an audio (or video) recording mode, a voice recognition mode, a broadcast reception mode, a media content (e.g., a music file and a moving image file) reproduction mode, and the like. The SPK 141 may output a sound signal related to a function performed by the user device. Examples of the function may include messenger execution, conversation reception, conversation transmission, content image display, the execution of a content image-related function, the reception of a call connection, the transmission of a call connection, image capturing, the reproduction of a media content file, and the like.

The MIC 143 may receive, as input, an external sound signal and may process the external sound signal into an electrical voice data, in the messenger mode, the call mode, the message mode, the audio (or video) recording mode, the voice recognition mode, and the like. In the call mode, the processed voice data may be converted into a form transmissible to a mobile communication base station through the mobile communication module 111, and the voice data in the form transmissible to the mobile communication base station may be output. Various noise removal algorithms may be implemented in the MIC 143 in order to remove noise generated in process of receiving the external sound signal as input.

The storage unit 150 may store programs for processing and control performed by the control unit 170, or may temporarily store input/output data. Examples of the input/output data may include messenger data (i.e., conversation data), a content image, contact information, a message, media content (e.g., audio, a moving image, and an image), and the like. The storage unit 150 may store the frequency of use, the level of importance, and priority according to the operation of a function of the user device, together. Examples of the frequency of use may include the frequency of use of an application, the frequency of use of an attribute for each application, the frequency of use of content, and the like. The storage unit 150 may store data on vibrations and sounds of various patterns, which are output in response to a touch input on the touch screen 130. For example, in an embodiment of the present disclosure, the storage unit 150 may store text matched to content, a content image matched to content, a function matched to content (or a content image), and the like. Here, data such as text, a content image, a function, or the like, which is matched to content, may be generated during execution of an application such as a messenger and the like, or may be periodically received or updated from or by a server through a wired and/or wireless communication network. The server may be managed by an advertiser, a communication service provider, a manufacturer, or the like that is related to content. The server may store data such as text, a content image, a function, or the like, which is matched to content, and may manage the data by updating the data periodically or whenever an event is generated.

In various embodiments of the present disclosure, examples of content may include multimedia content, digital content, Internet content, and the like in various industrial fields, which can be transmitted through a wired and/or wireless communication network. Here, examples of the various industrial fields may include recording, games, sightseeing (travel), movies, broadcasting, animation, publishing, food, and the like. For example, in various embodiments of the present disclsoure, examples of the content may include recording content, movie content, broadcast content, sightseeing (travel) content, food content, game content, animation content, and the like. According to an embodiment of the present disclsoure, when the user inputs text reading "Let's take a trip." into the messenger, the user device may sense the text, and may detect a word (i.e., "trip") related to "sightseeing (travel) content." In other words, according to various embodiments of the present disclsoure, the user device may detect text related to content (e.g., sightseeing (travel) content, broadcast content, movie content, food content, etc.) from a conversation exchanged through the messenger. Also, the user device may internally extract a content image related to the detected text (or content), or may acquire (e.g., download) the relevant content image from a relevant server. Here, the content image, for example, may be a content image having link information connected to a particular site (i.e., server) related to sightseeing (travel), and the like. Then, the user device may display the relevant content image as a background of the messenger.

The storage unit 150 may continuously or temporarily store an Operating System (OS) of the user device, a program related to an operation for controlling input and display using the touch screen 130, a program related to an operation for controlling the transmission/reception of data by the messenger, a program related to an operation for controlling the display of a content image as a background in the messenger, a program related to a function control operation performed in cooperation with a content image, data generated by an operation of each program, and the like.

The storage unit 150 may include a storage medium of at least one type from among a flash memory type, a hard disk type, a multimedia card micro type, a memory card type (e.g., a Secure Digital (SD) or eXtreme Digital (XD) memory card), a Dynamic Random Access Memory (DRAM), a Static RAM (SRAM), a Read Only Memory (ROM), a Programmable ROM (PROM), an Electrically Erasable PROM (EEPROM), a Magnetic RAM (MRAM), a magnetic disk, an optical disk, and the like. The user device may also operate in relation to a web storage which performs a storage function of the storage unit 150 on the Internet.

The interface unit 160 may serve as a passage to all external devices connected to the user device. The interface unit 160 may receive data transmitted by an external device, may be supplied with power and may deliver the power to each element within the user device, or may allow data within the user device to be transmitted to an external device. For example, the interface unit 160 may include a wired/wireless headset port, an external charger port, a wired/wireless data port, a memory card port, a port for connecting the user device to a device including an identity module, an audio Input/Output (I/O) port, a video I/O port, an earphone port, and the like.

The control unit 170 may control an overall operation of the user device. For example, the control unit 170 may perform control related to voice communication, data communication, video communication, and the like. The control unit 170 may process an operation related to a function of displaying information related to text, which is received as input inside or outside the messenger, on a background screen of the messenger, or may include a data processing module (not illustrated) which processes the operation related to the function.

According to various embodiments of the present disclosure, the control unit 170 may execute the messenger in response to a user input, and may display a conversation (particularly, text), which the user exchanges with at least one another user through the messenger, so as to be overlaid on the background of the messenger. The control unit 170 may sense the conversation (particularly, text) exchanged through the messenger, and may detect text (e.g., characters, a word, a word sequence, etc.) matched to particular content, from the exchanged text. Examples of a scheme in which the control unit 170 detects the particular content from the conversation may include a scheme for storing the corresponding text in the form of a mapping table, a semantic analysis scheme, an ontology scheme, and the like.

In the scheme for storing the corresponding text in the form of a mapping table, when the corresponding text matched to the particular content is stored in the form of a mapping table, if the control unit 170 searches the conversation for the corresponding text and text which coincides with or is similar to the corresponding text is included in the conversation, the control unit 170 may determine that the particular content is detected.

In the semantic analysis scheme or the ontology scheme, the control unit 170 extracts meaning from the conversation (or text), and analyzes a correlation between a concept corresponding to the extracted meaning and a concept matched to content. When the correlation has a value greater than or equal to a predetermined value, the control unit 170 may determine that the particular content is detected. Also, in the semantic analysis scheme or the ontology scheme, the user device may include data, a drive engine, and the like for implementing the relevant algorithm, or a server may include at least a part of modules such as the data, the drive engine and the like. According to an embodiment of the present disclsoure, the user device may transmit the conversation (or text) to the server, and may receive information as to whether the particular content has been detected, from the server. Alternatively, a step of transmitting the conversation from the user device to the server may be omitted. For example, a service server which provides a messenger service may determine whether the particular content has been detected, or a separate server which receives the conversation from the service server may determine whether the particular content has been detected. Alternatively, use may be made of a hybrid scheme in which a content detection process is divided into sub-processes and the user device and the server perform the sub-processes. In addition, it should be noted that various schemes other than the above-described detection schemes may be used and schemes including the above-described detection schemes may be modified and used or may be used in a combination thereof.

The control unit 170 may acquire a content image related to content of the detected text, and may display the acquired content image as a background of the messenger. When displaying the acquired content image as the background of the messenger, the control unit 170 does not replace a background (hereinafter referred to as an "original background") which is basically set for the messenger, but may overlay the content image on the original background and may provide the content image overlaid on the original background.

In the present example, because a main function of the messenger is intended to provide in real time a conversation between the users, it is required to maintain the visibility of a speech bubble including an identifier (e.g., an icon, an image, etc.) indicating the contents of the conversation exchanged between the users and a subject of the conversation. Accordingly, when displaying the content image as the background, the control unit 170 may perform a control operation for displaying the content image in between the original background and a speech bubble. According to an embodiment of the present disclsoure, a content image may be provided in such a manner as to generate a new layer between a layer in which the original background is provided and another layer in which a speech bubble is provided. Also, according to various embodiments of the present disclosure, a user input may be supported for each of the original background, a content image and a speech bubble.

The control unit 170 may execute a function related to the content image in response to a user input related to the content image in a state of displaying the content image, and may operate so as to display a related screen according to the execution of the function. When the content image is selected, the control unit 170 may analyze the type (e.g., information providing type) of the relevant content (or content image), and may operate so as to execute a function matched to the analyzed type (e.g., information providing type). The control unit 170 may perform a control operation for providing related information of the content through the executed function. Also, when displaying the content image, the control unit 170 may count a time period for displaying the content image. When a set time period elapses, the control unit 170 may operate so as to remove the displayed content image.

In a state of displaying the content image or in a state where no content image is displayed, the control unit 170 may extract a content image related to content of text selected in response to a user input related to the text of a previous conversation, and may operate so as to display the extracted content image. At this time, when there exists a content image currently being displayed, the control unit 170 may replace the currently-displayed content image by the extracted content image, and may display the replaced content image.

Control operations of the control unit 170 will be described together with operations of the user device and a control method thereof with reference to the accompanying drawings.

The control unit 170 may control various operations related to typical functions of the user device as well as the above-described functions. For example, when a particular application is executed, the control unit 170 may control the operation and screen display of the particular application. Also, the control unit 170 may receive input signals corresponding to the input of various touch events supported by a touch-based input interface (e.g., the touch screen 130), and may control the operation of functions according to the received input signals. Further, the control unit 170 may control the transmission and reception of various data, which are based on wired communication or wireless communication.

Under the control of the control unit 170, the power supply unit 180 may be supplied power from an external power source or an internal power source, and may provide power required for an operation of each element within the user device.

In various embodiments of the present disclsoure as described above, examples of the user device may include all types of devices, which use an Application Processor (AP), a Graphics Processing Unit (GPU) and a Central Processing Unit (CPU), such as all types of information communication devices, all types of multimedia devices, and application devices for all types of the information communication devices and all types of the multimedia devices, which support functions according to the various embodiments of the present disclsoure. For example, examples of the user device may include devices, such as a mobile communication terminal, a tablet Personal Computer (PC), a smart phone, a Portable Multimedia Player (PMP), a Media Player (e.g., an MP3 player), a portable game terminal, a Personal Digital Assistant (PDA), and the like, which operate according to communication protocols respectively matched to various communication systems. Also, a method for controlling a function, according to various embodiments of the present disclsoure, may be operated so as to be applied to various display devices, such as a laptop computer (e.g., a notebook), a PC, a Digital Television (TV), a Digital Signage (DS), a Large Format Display (LFD), and the like.

The various embodiments described herein may be implemented in, for example, a recording medium readable by a computer or an apparatus similar to the computer by using software, hardware, or some combinations thereof For hardware implementation, the various embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and other electrical units for executing functions.

Here, the recording medium may include a computer-readable recording medium storing a program for performing an operation of displaying a conversation exchanged through the messenger, an operation of detecting text related to content in the conversation, an operation of displaying a content image matched to the content on the background of the messenger, and an operation of providing information related to the content in response to the selection of the content image.

In some cases, the various embodiments described in this specification may be implemented by the control unit 170 itself For software implementation, the various embodiments such as procedures and functions described in this specification may be implemented by separate software modules. Each of the software modules may perform one or more functions and operations described in this specification.

FIGS. 2A to 2D are views each illustrating an example of an operation of providing information through a messenger in a user device according to an embodiment of the present disclosure.

In the various embodiments illustrated in FIGS. 2A to 2D, a case is described as an example in which a function related to content is a function of displaying a related website (or homepage). For example, FIGS. 2A to 2D each illustrate an example of an operation of a case in which, when sightseeing (travel) content related to travel is recognized in input text, a content image as a background image is provided which has link information on a website from which a ticket can be booked in relation to the travel, and a travel-related website is provided in response to a user input selecting the content image.

Figure 2A:
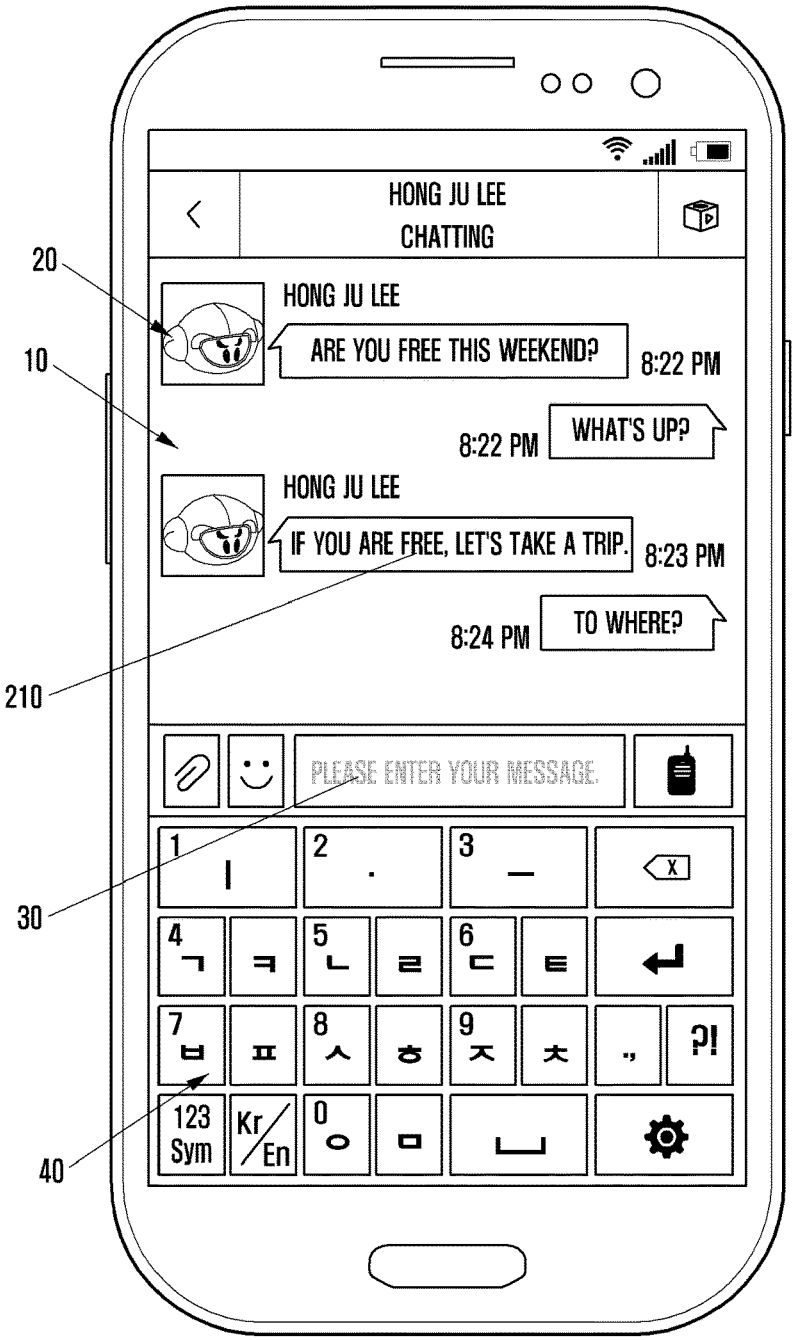
FIGS. 2A, 2B, 2C, and 2D are views each illustrating an example of an operation of providing information through a messenger in a user device according to an embodiment of the present disclosure.

Referring to FIGS. 2A to 2D, FIG. 2A illustrates an example of a screen of the user device while the user of the user device executes the messenger and converses (chats) with at least one conversation partner through the messenger. As illustrated in FIG. 2A, the messenger may provide an execution screen, which includes a background 10 which is basically set for the messenger or is set by the user; a speech bubble 20 which provides an identifier capable of identifying a subject of a conversation and the contents (e.g., text, an emoticon, an image, a moving image, etc.) of the conversation; and a text input window 30 which displays the contents of a conversation entered by the user. Also, the messenger may include a keypad 40 activated or deactivated in response to a user input.

Referring to FIG. 2A, the user device may display a conversation exchanged between the users through the speech bubble 20. At this time, the user device may sense text of the exchanged conversation, and may detect text (e.g., characters, a word, a word sequence, etc.) matched to particular content by sensing the text. In an embodiment illustrated in FIG. 2A, a state may be a state of detecting a content 210 related to "travel" in the text received from the conversation partner. According to an embodiment of the present disclsoure, the user device may recognize "travel" related to the sightseeing (travel) content through text sensing in the text reading "If you can take the time, let's take a trip." received from the conversation partner.

According to various embodiments of the present disclosure, a target user matched to text to be recognized may be set according to the user's selection. For example, the target user may be set so as to recognize only text entered by the user, may be set so as to recognize only text entered by the conversation partner, or may be set so as to recognize both the text entered by the user and the text entered by the conversation partner. According to an embodiment of the present disclosure, when the target user is set so as to recognize only text entered by the user, if the user device detects the input of text by the user of the user device in a conversation exchanged between the users, the user device may perform a text recognition operation. Alternatively, when the target user is set so as to recognize only text received from the conversation partner, if the user device detects the reception of text from the conversation partner in the conversation exchanged between the users, the user device may perform a text recognition operation. Alternatively, when the target user is set so as to recognize both the text entered by the user and the text received from the conversation partner, the user device may perform a text recognition operation on both the text entered by the user and the text received from the conversation partner in the conversation exchanged between the users.

Figure 2B:
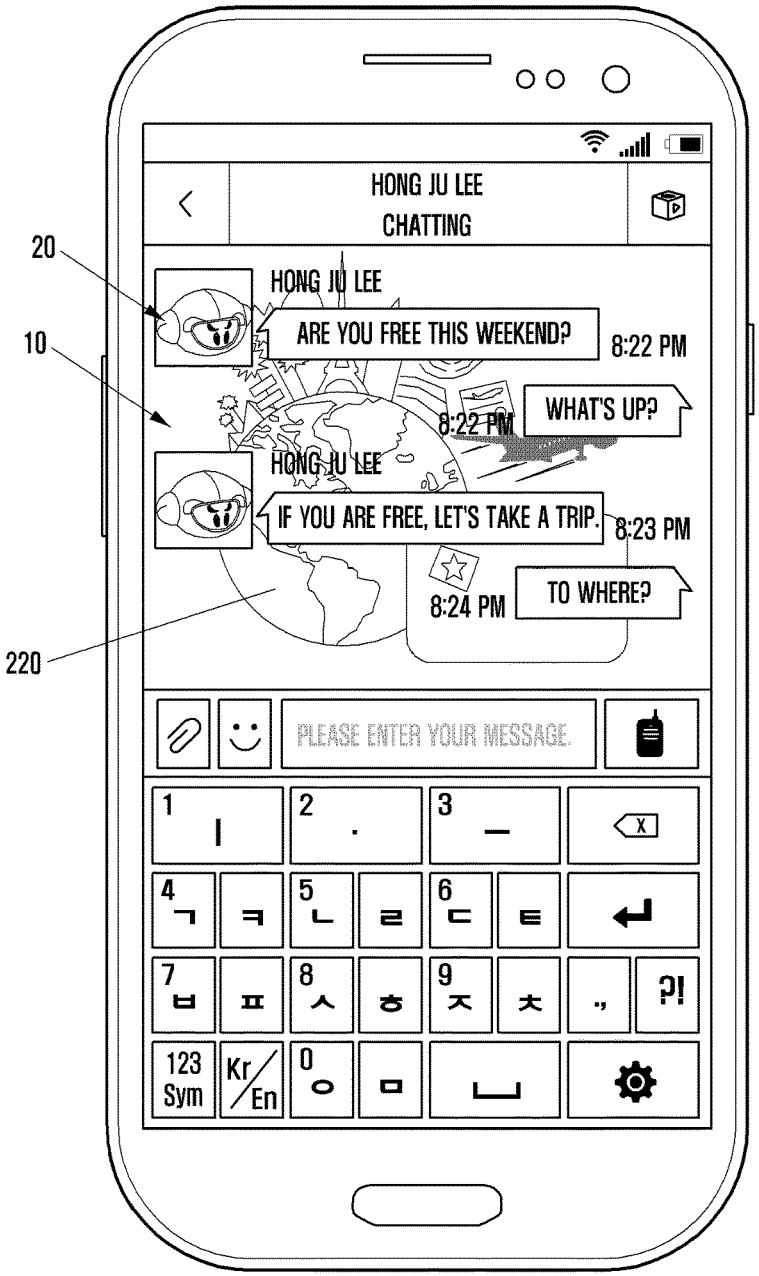

As illustrated in FIG. 2B, when the text matched to the particular content has been detected, the user device may extract a content image 220 mapped to the particular content and may display the extracted content image 220 as a background of the messenger. As further illustrated in FIG. 2B, the user device may display the content image 220 in between the original background 10 of the messenger and the speech bubble 20, and may operate so that the speech bubble 20 may not be covered by the content image 220.

When displaying the content image 220, the user device may count a set time period (e.g., 15 seconds, etc.), and enable the content image 220 to be displayed during the set time period. Then, when the set time period elapses, the user device may remove the content image 220. Also, when new content is recognized in newly-input text while the content image 220 is displayed, the user device may extract a content image matched to the relevant content, and may operate so as to display the extracted content image.

Further, in a state as illustrated in FIG. 2B, the user device may select the previously-input text related to the particular content. Then, the user device may recognize content of text in response to a user input selecting the relevant text, may extract a content image matched to the recognized content, and may display the extracted content image. For example, according to an embodiment of the present disclsoure, the user device may provide a function of reading previously-provided information.

Figure 2C:
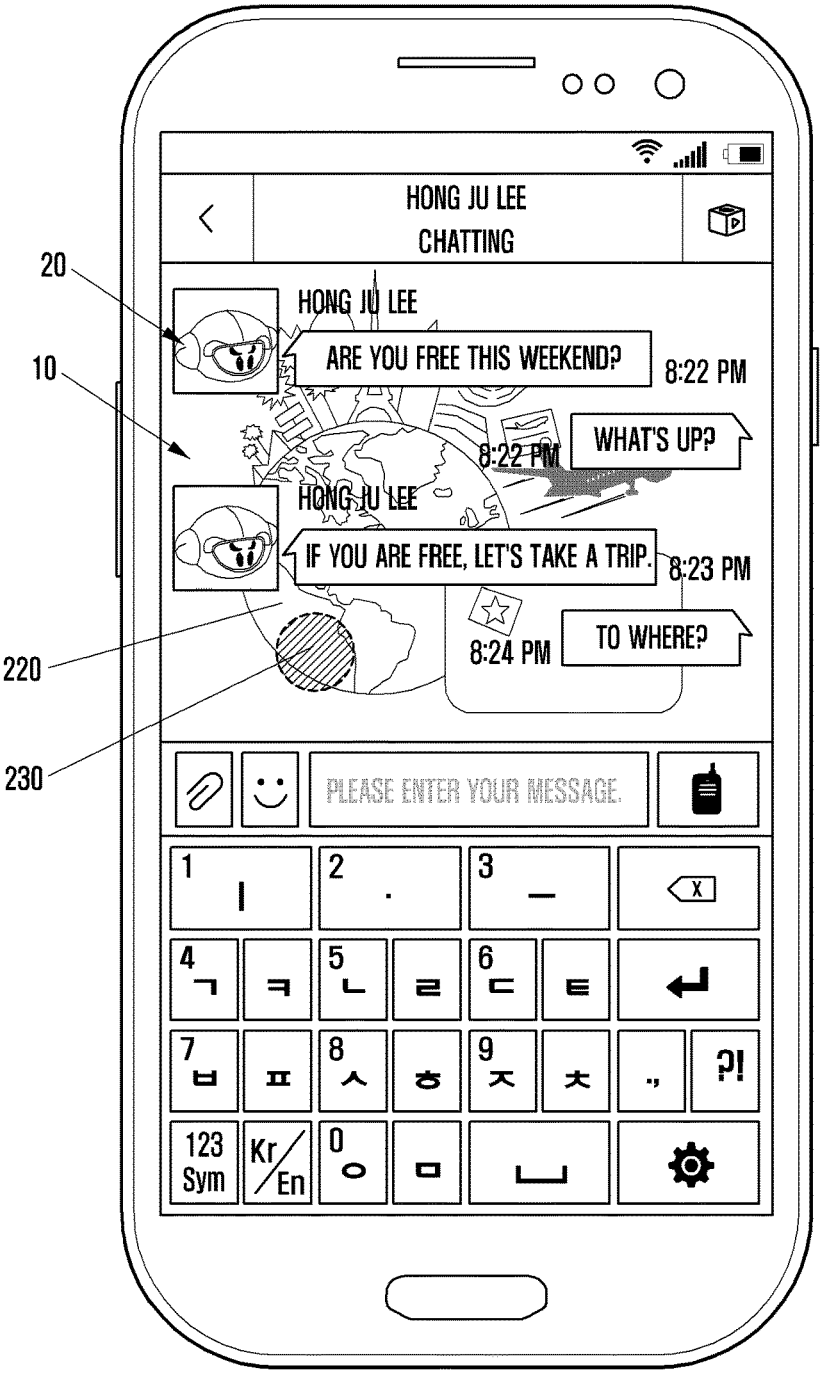

In the state of displaying the content image 220 as illustrated in FIG. 2B, the user may select (i.e., touch as indicated by reference numeral 230) the displayed content image 220, as illustrated in FIG. 2C. Then, the user device may determine which function is related to the content image 220 (or content) in response to a user input 230 selecting the relevant content image 220, and may operate so as to execute the related function. For example, as described above, the execution of a travel-related application, the display of a travel-related website, or the like may be set as a function mapped to the sightseeing (travel) content.

Figure 2D:
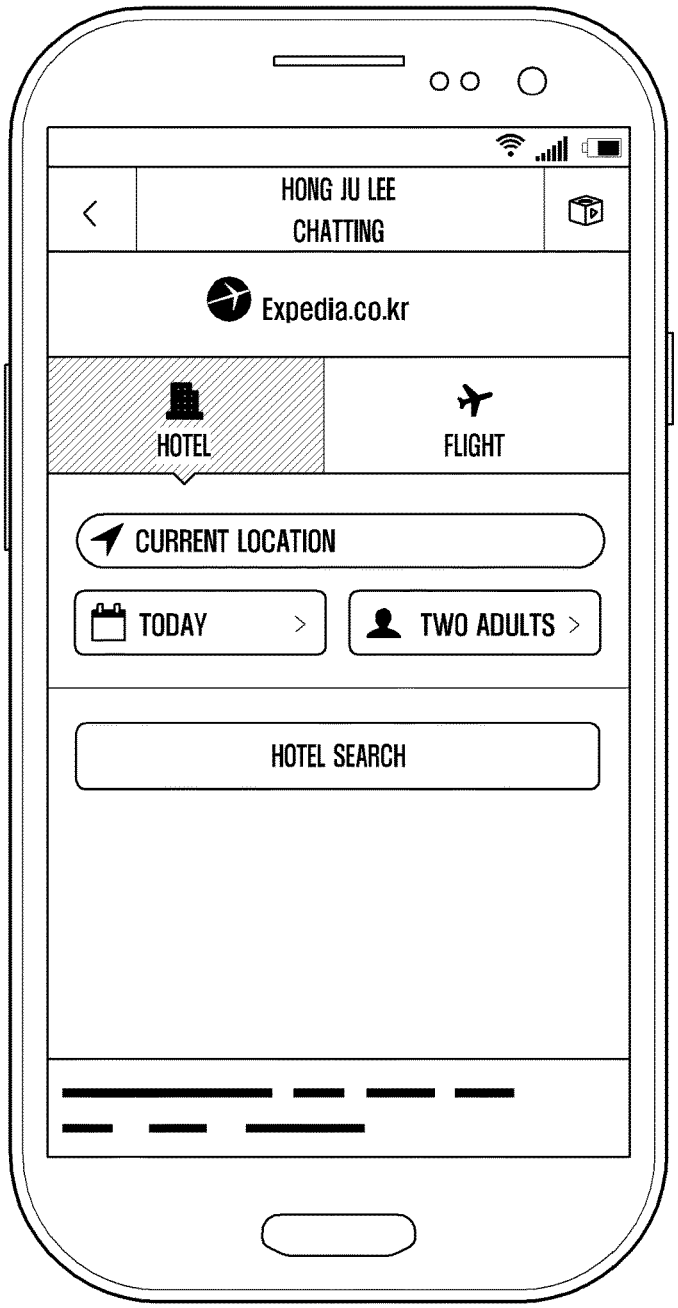

Accordingly, as illustrated in FIG. 2D, the user device may execute the function related to the sightseeing (travel) content, and may display an execution screen according to the execution of the function. According to an embodiment of the present disclsoure, the user device may operate so as to display a website related to content of the relevant text (e.g., travel) in response to a user input related to the content image 220 displayed as the background. Then, after displaying the relevant website, the user device may perform an operation (e.g., booking a ticket, etc.) related to the function executed in response to the user input. Alternatively, the user device may change the current screen to the screen illustrated in FIG. 2C in response to a user input for proceeding to the previous step, and may perform a messenger function.

FIGS. 3A to 3D are views each illustrating another example of an operation of providing information through a messenger in a user device according to an embodiment of the present disclosure.

In the various embodiments illustrated in FIGS. 3A to 3D, a case is described as an example in which a function related to content is a search function. For example, FIGS. 3A to 3D each illustrate an example of an operation of a case in which, when broadcast content related to a broadcast is recognized in input text, a content image as a background image is provided which has link information enabling the identification of a result of searching for the relevant broadcast content, and a result of searching for the relevant broadcast content on a portal site is provided in response to a user input selecting the content image.

Referring to FIGS. 3A to 3D, FIG. 3A illustrates an example of a screen of the user device while the user of the user device executes the messenger and converses (chats) with at least one conversation partner through the messenger.

Figure 3A:
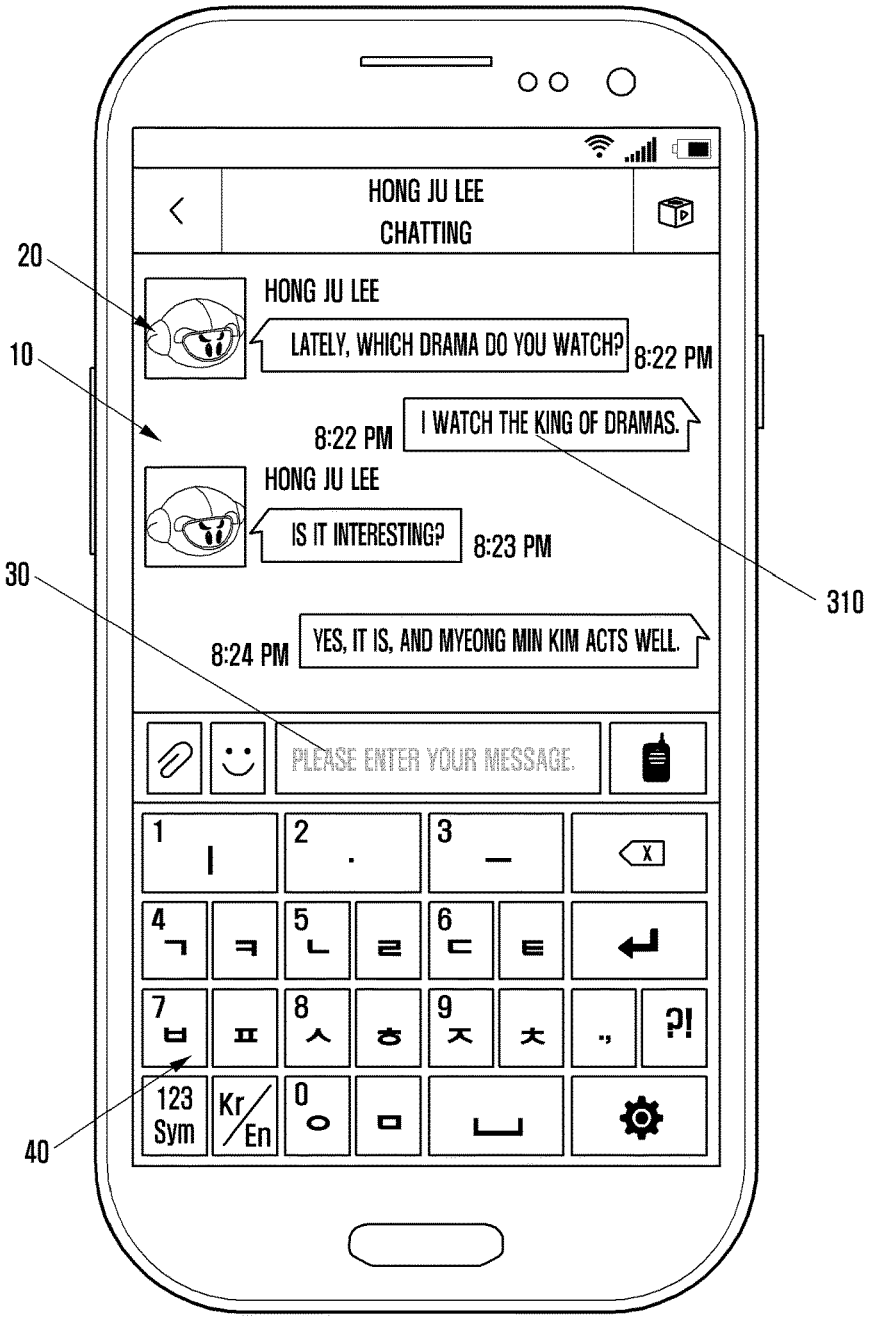
FIGS. 3A, 3B, 3C, and 3D are views each illustrating another example of an operation of providing information through a messenger in a user device according to an embodiment of the present disclosure.

Referring to FIG. 3A, the user device may display a conversation exchanged between the users through the speech bubble 20. At this time, the user device may sense text of the exchanged conversation, and may detect text matched to particular content by sensing the text. In an embodiment illustrated in FIG. 3A, a state may be a state of detecting a content 310 related to a "broadcast" in the text entered by the user. According to an embodiment of the present disclsoure, the user device may recognize "drama" related to the broadcast content through text sensing in the text reading "I watch The King of Dramas." entered by the user.

Figure 3B:
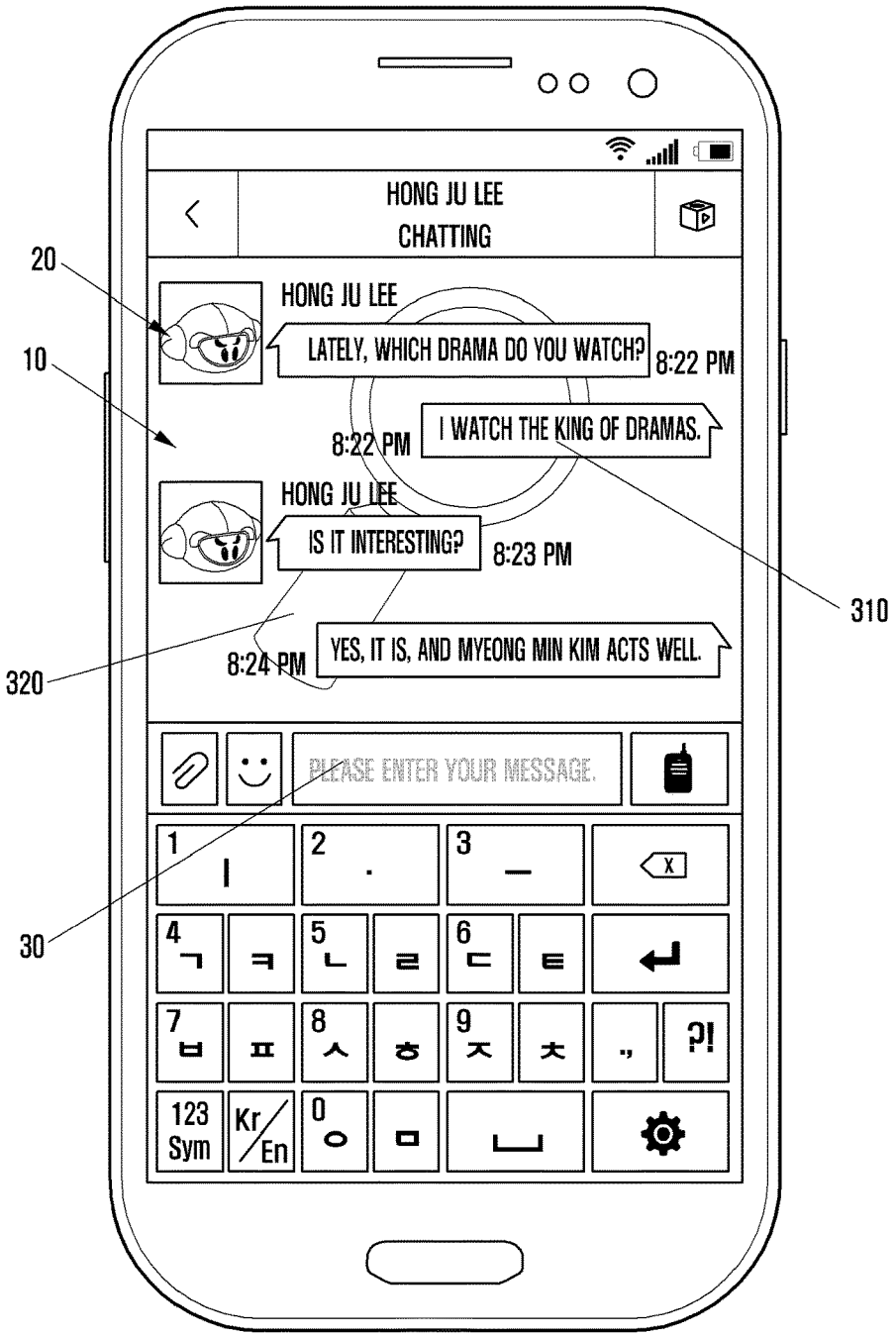

As illustrated in FIG. 3B, when the text matched to the particular content has been detected, the user device may extract a content image 320 mapped to the particular content and may display the extracted content image 320 as a background of the messenger. As further illustrated in FIG. 3B, the user device may display the content image 320 in between the original background 10 of the messenger and the speech bubble 20. When displaying the content image 320, the user device may perform a control operation for exposing the relevant content image 320 during a set time period, or may perform a control operation for exposing the relevant content image 320 until the generation of a new event (e.g., the recognition of new content, the selection of text of the previous content, or the like).

Figure 3C:
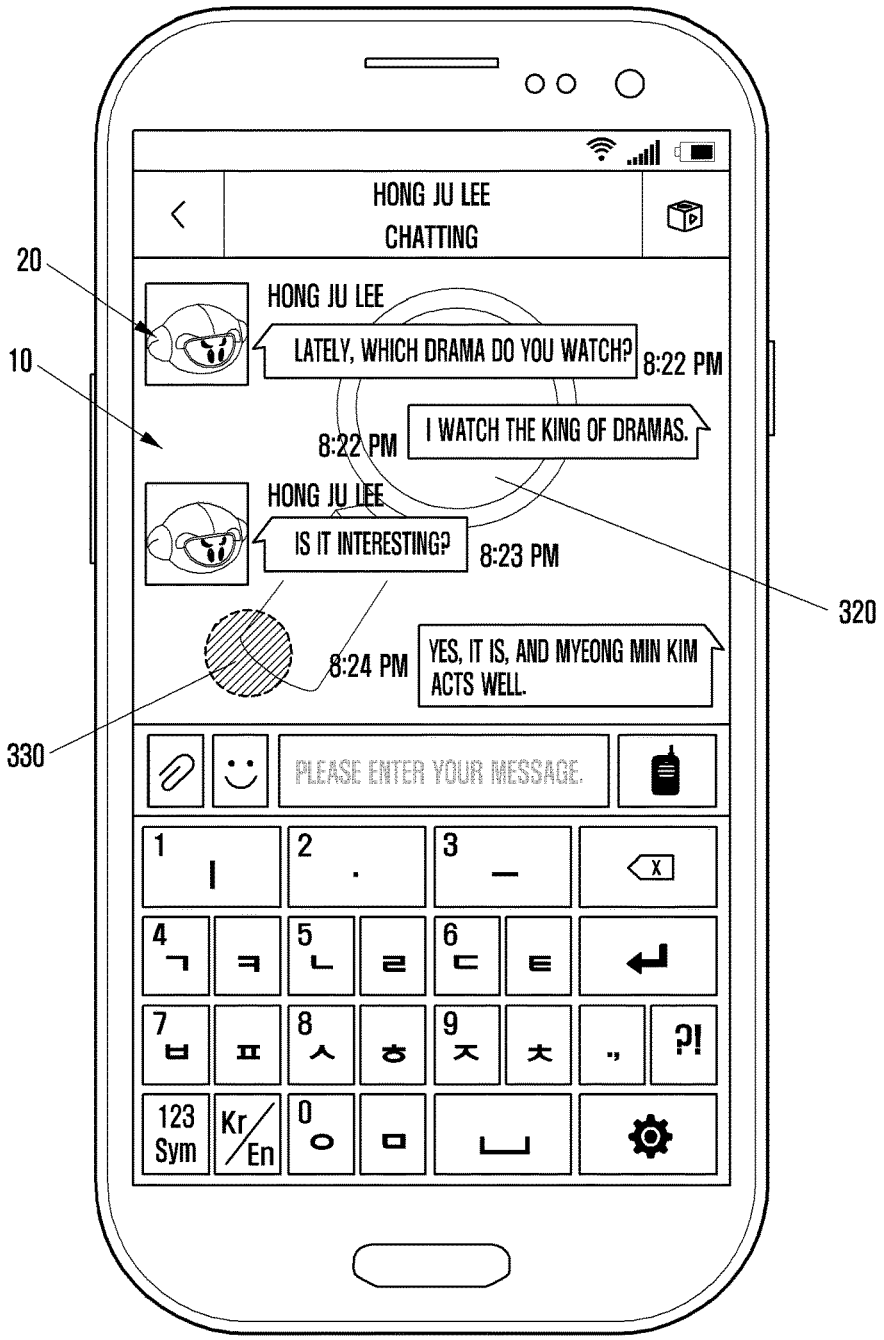

In the state of displaying the content image 320 as illustrated in FIG. 3B, the user may select (i.e., touch as indicated by reference numeral 330) the displayed content image 320, as illustrated in FIG. 3C. Then, the user device may determine which function is related to the content image 320 (or content) in response to a user input 330 selecting the relevant content image 320, and may operate so as to execute the related function. For example, as described above, a function of searching for broadcast content of the recognized text and providing a result of the search may be set as a function mapped to the broadcast content.

Figure 3D:
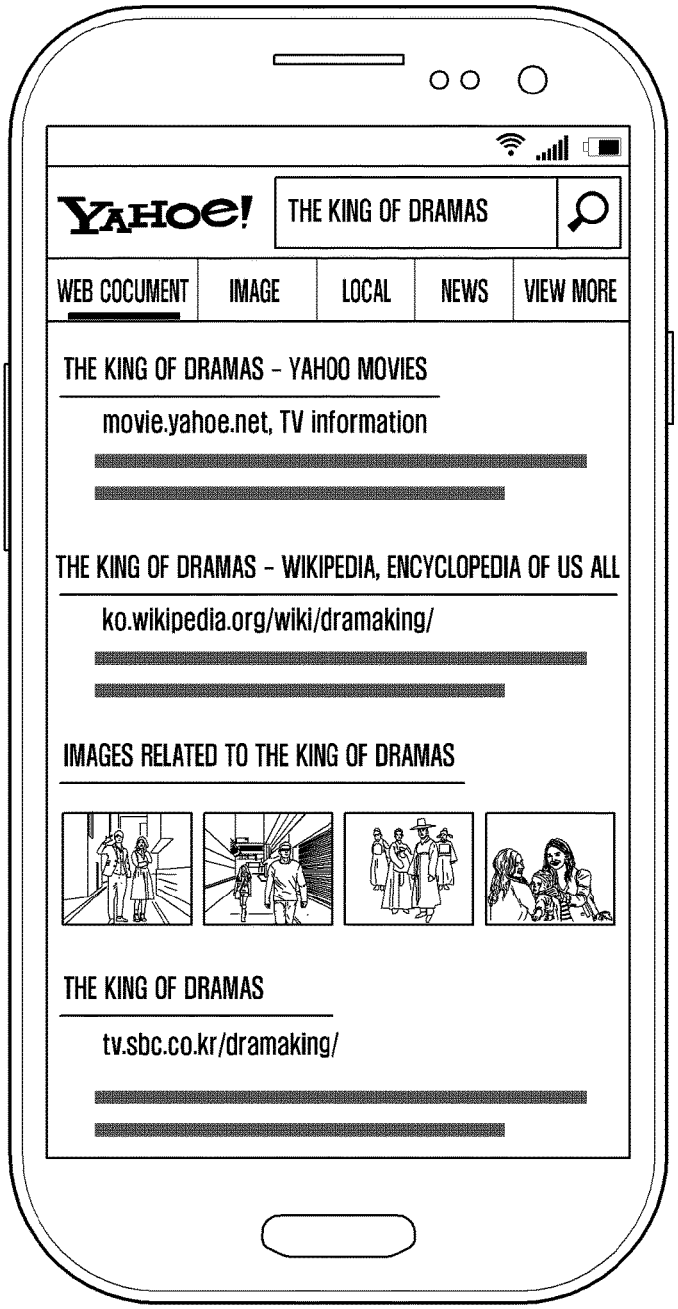

Accordingly, as illustrated in FIG. 3D, the user device may execute the function related to the broadcast content, and may display an execution screen according to the execution of the function. According to an embodiment of the present disclsoure, the user device may operate so as to display a result of searching for content of the relevant text (e.g., The King of Dramas) on a portal site in response to a user input related to the content image 320 displayed as the background. Then, after displaying the relevant result of the search, the user device may perform an operation (e.g., detailed information display according to link selection matched to the relevant result of the search, etc.) related to the function executed in response to the user input. Alternatively, the user device may change the current screen to the screen illustrated in FIG. 3C in response to a user input for proceeding to the previous step, and may perform a messenger function.

FIGS. 4A to 4D are views each illustrating still another example of an operation of providing information through a messenger in a user device according to an embodiment of the present disclosure.

In the various embodiments illustrated in FIGS. 4A to 4D, a case is described as an example in which a function related to content is the execution of an application. For example, FIGS. 4A to 4D each illustrate an example of an operation of a case in which, when movie content related to movies is recognized in input text, a content image as a background image is provided which has link information enabling the execution of an application related to the relevant movie content, and the application related to the relevant movie content is executed and provided in response to a user input selecting the content image.

Referring to FIGS. 4A to 4D, FIG. 4A illustrates an example of a screen of the user device while the user of the user device executes the messenger and converses (chats) with at least one conversation partner through the messenger.

Figure 4A:
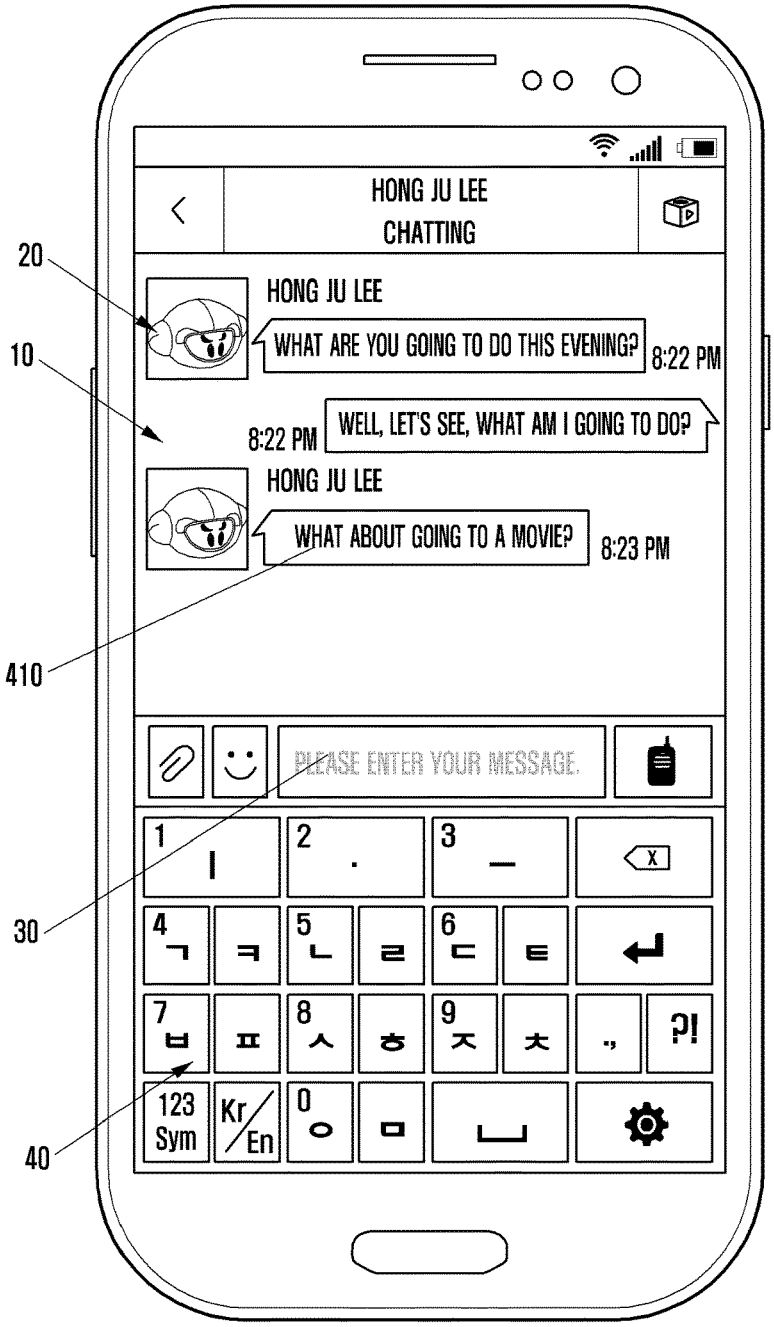
FIGS. 4A, 4B, 4C, and 4D are views each illustrating still another example of an operation of providing information through a messenger in a user device according to an embodiment of the present disclosure.

Referring to FIG. 4A, the user device may display a conversation exchanged between the users through the speech bubble 20. At this time, the user device may sense text of the exchanged conversation, and may detect text matched to particular content by sensing the text. In an embodiment illustrated in FIG. 4A, a state may be a state of detecting a content 410 related to "movies" in the text entered by the user. According to an embodiment of the present disclosure, the user device may recognize "movie" related to the movie content through text sensing in the text reading "What about going to a movie?" received from the conversation partner.

Figure 4B:
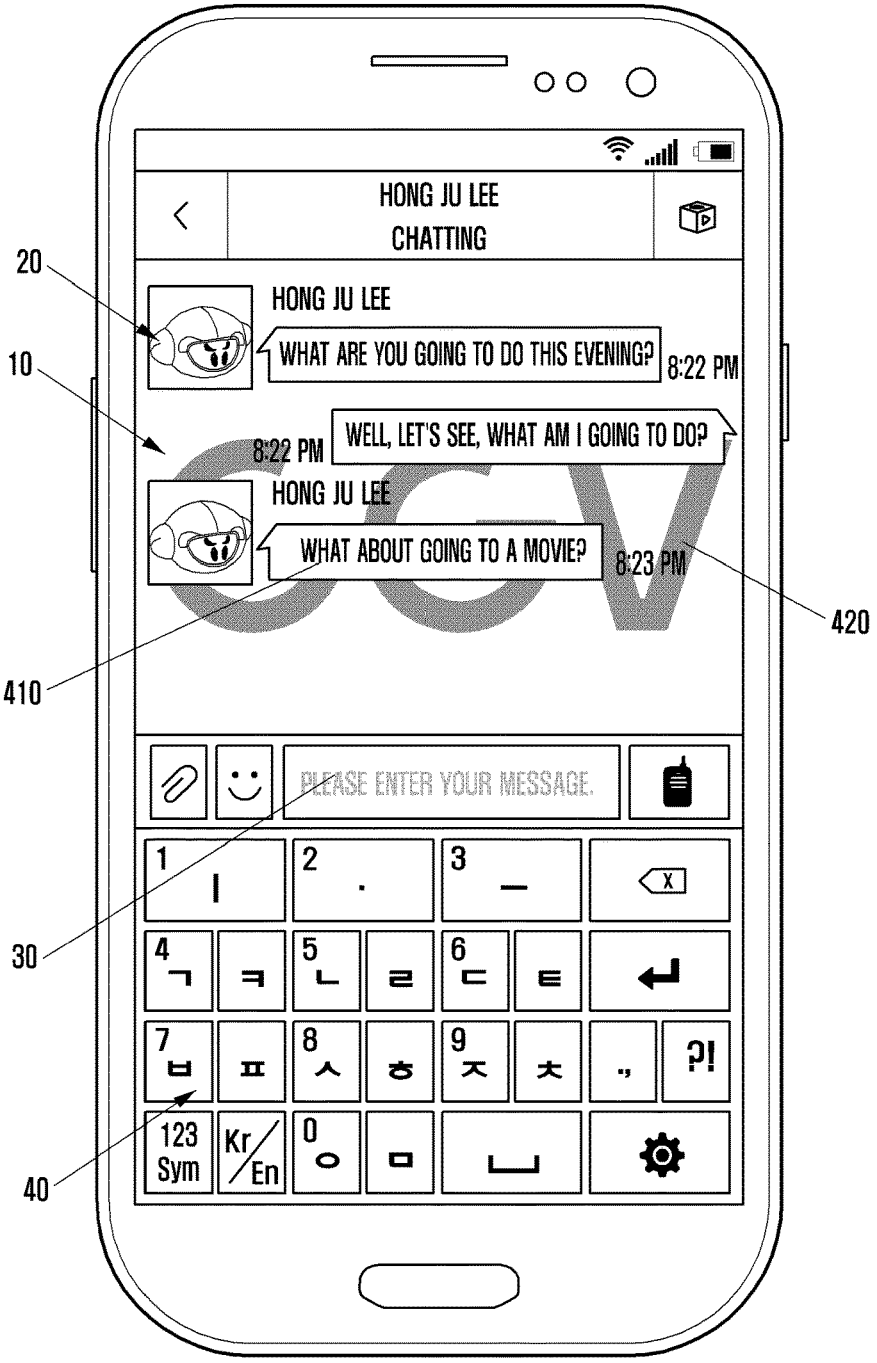

As illustrated in FIG. 4B, when the text matched to the particular content has been detected, the user device may extract a content image 420 mapped to the particular content and may display the extracted content image 420 as a background of the messenger. As further illustrated in FIG. 4B, the user device may display the content image 420 in between the original background 10 of the messenger and the speech bubble 20. When displaying the content image 420, the user device may perform a control operation for exposing the relevant content image 420 during a set time period, or may perform a control operation for exposing the relevant content image 420 until the generation of a new event (e.g., the recognition of new content, the selection of text of the previous content, or the like).

Figure 4C:
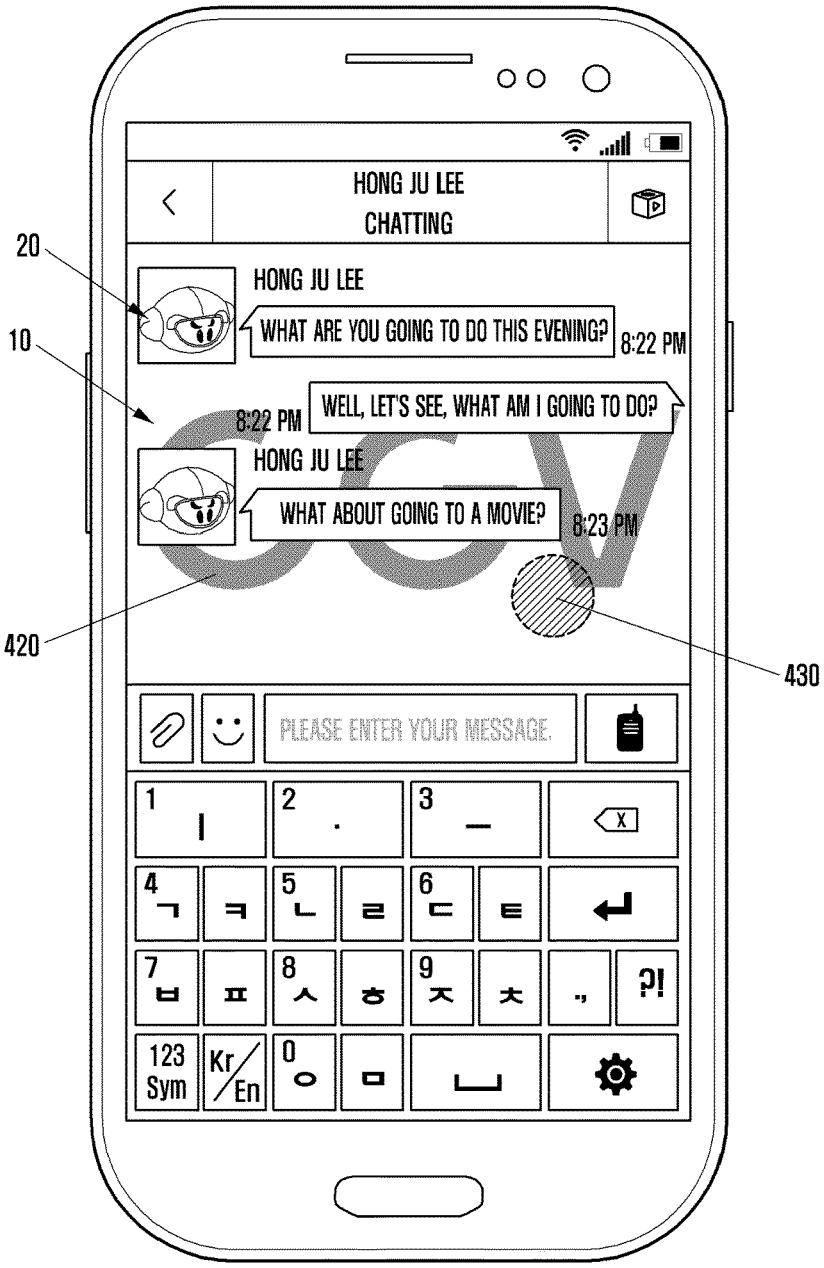

In the state of displaying the content image 420 as illustrated in FIG. 4B, the user may select (i.e., touch as indicated by reference numeral 430) the displayed content image 420, as illustrated in FIG. 4C. Then, the user device may determine which function is related to the content image 420 (or content) in response to a user input 430 selecting the relevant content image 420, and may operate so as to execute the related function. For example, as described above, a function of executing a movie-related application may be set as a function mapped to the movie content.

Figure 4D:
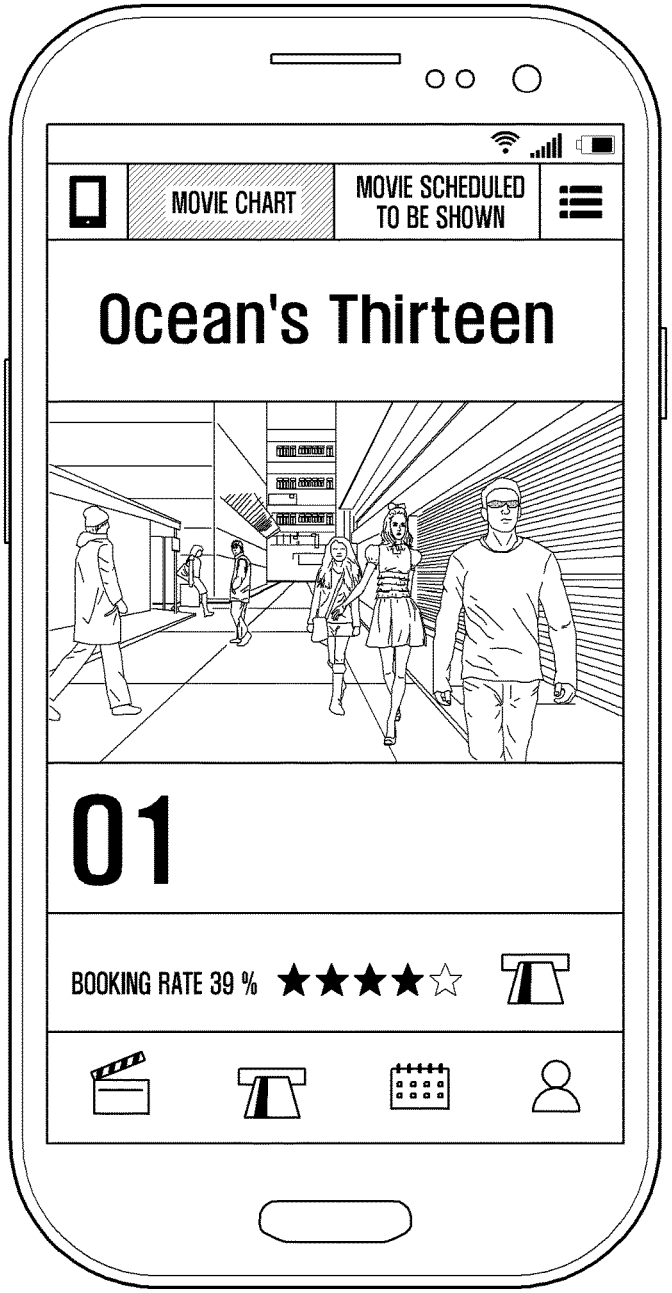

Accordingly, as illustrated in FIG. 4D, the user device may execute the function related to the movie content, and may display an execution screen according to the execution of the function. According to an embodiment of the present disclsoure, the user device may operate so as to execute an application related to content of the relevant text (e.g., movie) and display a relevant screen in response to a user input related to the content image 420 displayed as the background. Then, after displaying the screen according to the execution of the application, the user device may perform an operation (e.g., a movie search, the output of detailed information, purchase in advance, etc.) related to the function executed in response to the user input. Alternatively, the user device may change the current screen to the screen illustrated in FIG. 4C in response to a user input for proceeding to the previous step, and may perform a messenger function.

FIGS. 5A to 5D are views each illustrating yet another example of an operation of providing information through a messenger in a user device according to an embodiment of the present disclosure.

In the various embodiments illustrated in FIGS. 5A to 5D, a case is described as an example in which a function related to content is to provide a particular coupon (e.g., a discount coupon, etc.) through the messenger. For example, FIGS. 5A to 5D each illustrate an example of an operation of a case in which a discount coupon related to food content is provided when the food content related to food is recognized in input text.

Referring to FIGS. 5A to 5D, FIG. 5A illustrates an example of a screen of the user device while the user of the user device executes the messenger and converses (chats) with at least one conversation partner through the messenger.

Figure 5A:
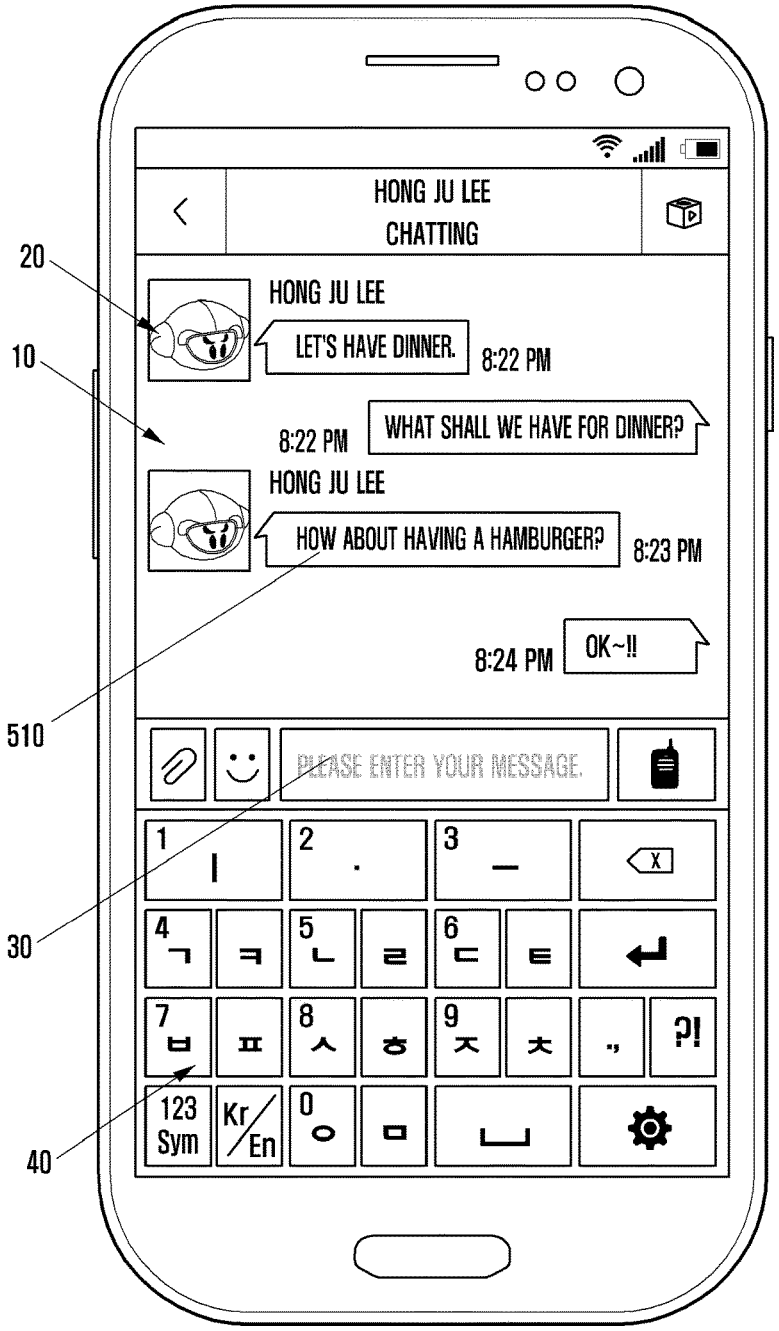
FIGS. 5A, 5B, 5C, and 5D are views each illustrating yet another example of an operation of providing information through a messenger in a user device according to an embodiment of the present disclosure.

Referring to FIG. 5A, the user device may display a conversation exchanged between the users through the speech bubble 20. At this time, the user device may sense text of the exchanged conversation, and may detect text matched to particular content by sensing the text. In an embodiment illustrated in FIG. 5A, a state may be a state of detecting a content 510 related to "food" in the text entered by the user. According to an embodiment of the present disclsoure, the user device may recognize "hamburger" related to the food content through text sensing in the text reading "How about having a hamburger?" received from the conversation partner.

Figure 5B:
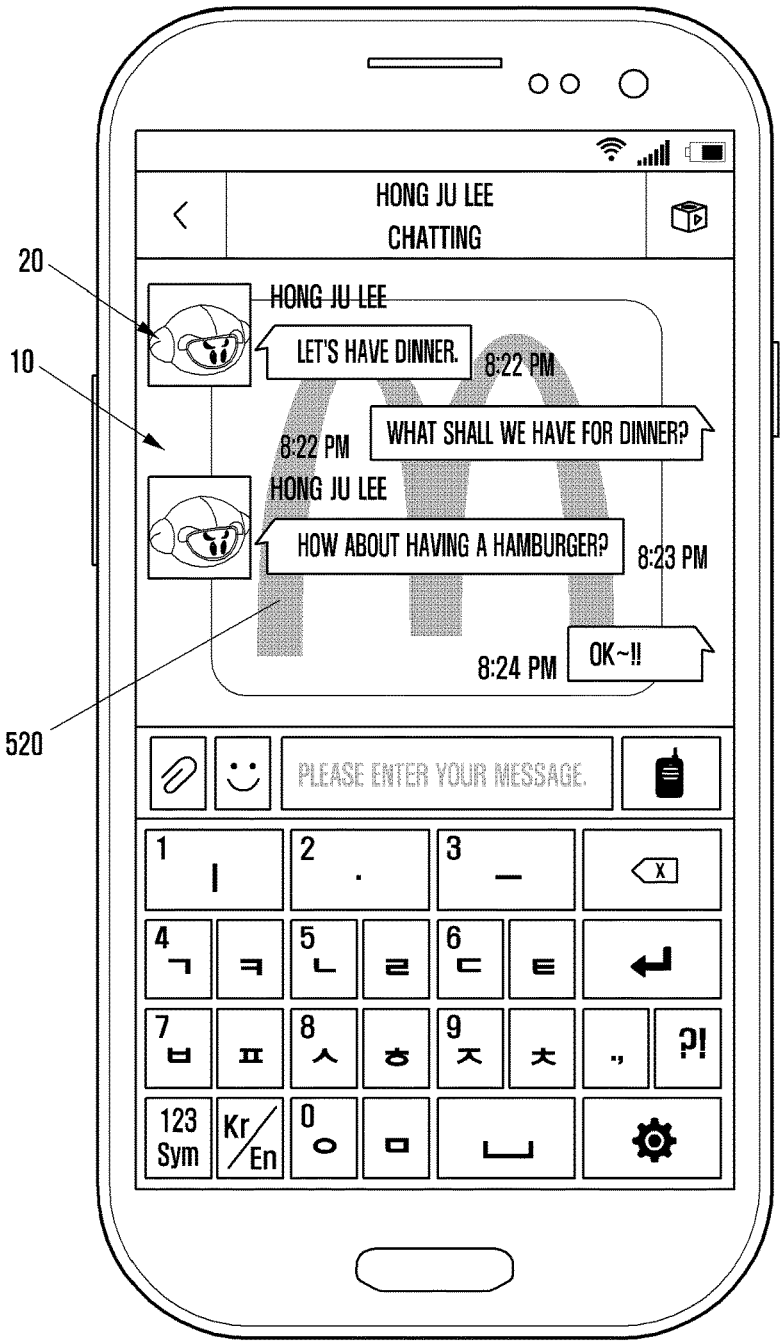

As illustrated in FIG. 5B, when the text matched to the particular content has been detected, the user device may extract a content image 520 mapped to the particular content and may display the extracted content image 520 as a background of the messenger. As further illustrated in FIG. 5B, the user device may display the content image 520 in between the original background 10 of the messenger and the speech bubble 20. When displaying the content image 520, the user device may perform a control operation for exposing the relevant content image 520 during a set time period, or may perform a control operation for exposing the relevant content image 520 until the generation of a new event (e.g., the recognition of new content, the selection of text of the previous content, or the like).

Figure 5C:
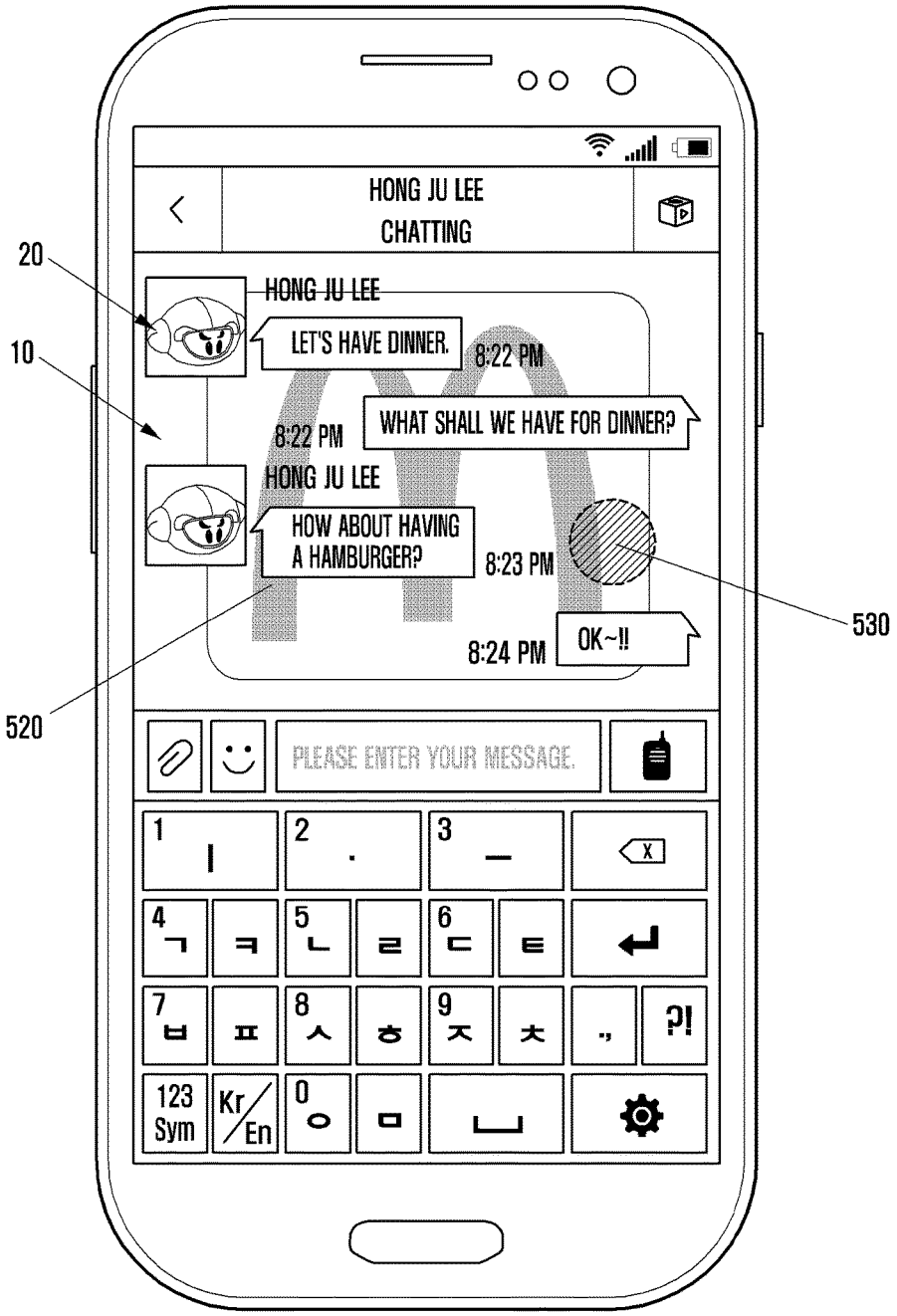

In the state of displaying the content image 520 as illustrated in FIG. 5B, the user may select (i.e., touch as indicated by reference numeral 530) the displayed content image 520, as illustrated in FIG. 5C. Then, the user device may determine which function is related to the content image 520 (or content) in response to a user input 530 selecting the relevant content image 520, and may operate so as to execute the related function. For example, as described above, a function of providing a discount coupon may be set as a function mapped to the food content.

Figure 5D:
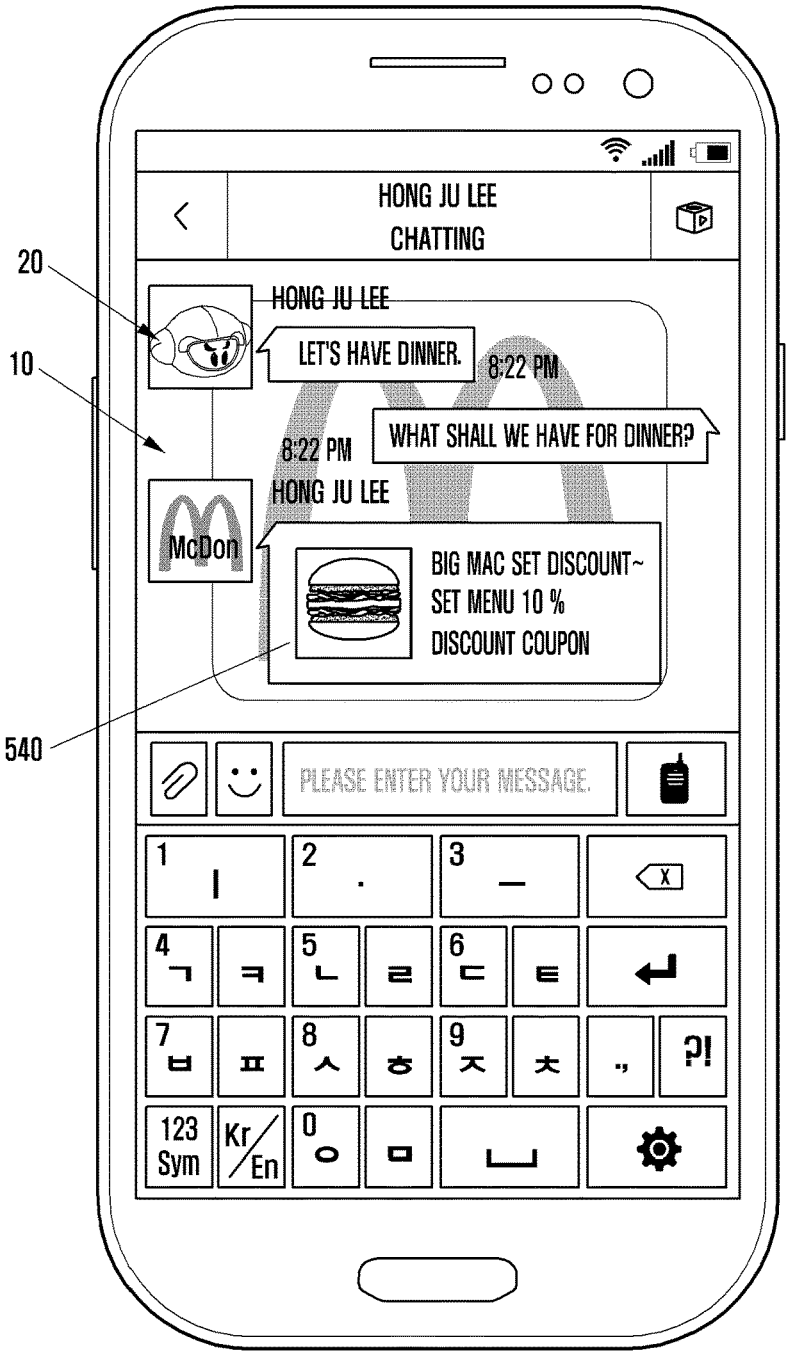

Accordingly, as illustrated in FIG. 5D, the user device may execute the function related to the food content, and may display an execution screen according to the execution of the function. According to an embodiment of the present disclsoure, the user device may operate so as to extract, internally or from the outside, a discount coupon 540 related to content of the relevant text (e.g., hamburger) and display the extracted discount coupon 540 through the speech bubble 20 in response to a user input related to the content image 520 displayed as the background. Then, after displaying the screen according to providing the discount coupon 540, the user device may perform an operation (e.g., using (applying) the discount coupon 540 through a user input selecting (touching) the discount coupon 540 of the speech bubble 20, etc.) related to the function executed in response to the user input.

Figure 6:
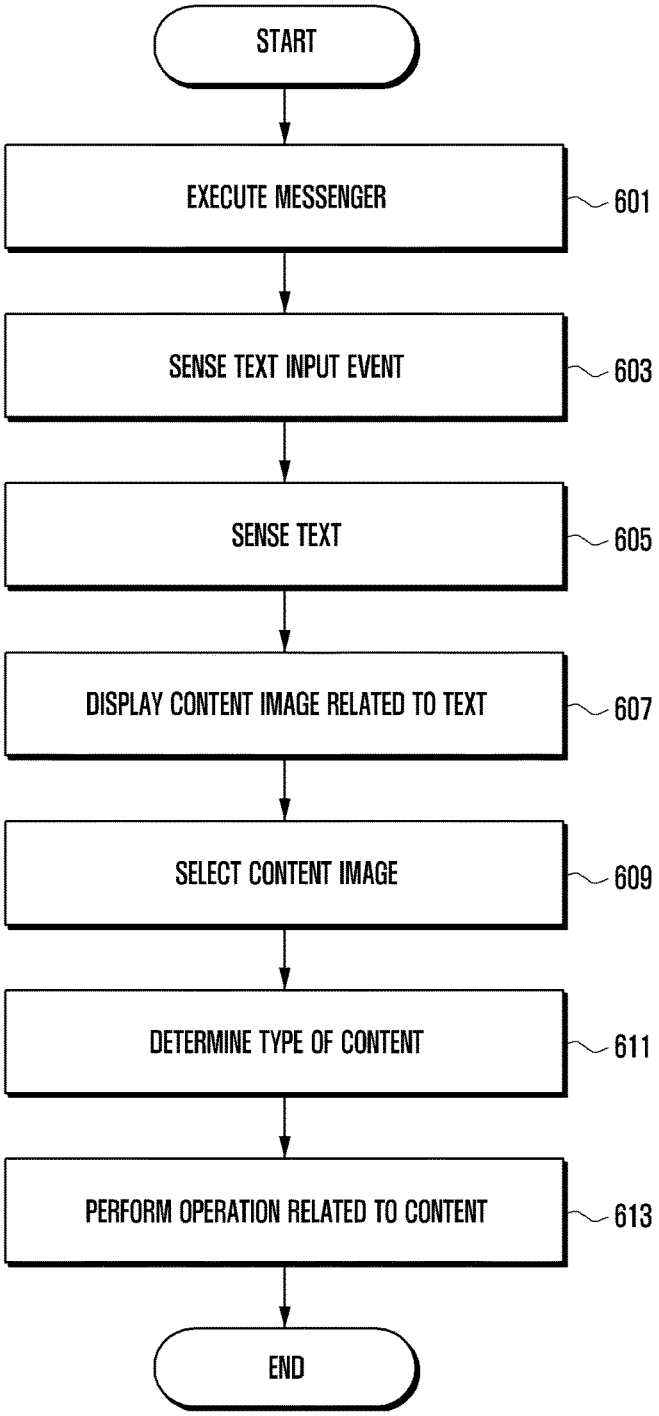
FIG. 6 is a flowchart illustrating a method for providing information through a messenger in a user device according to an embodiment of the present disclosure.

FIG. 6 is a flowchart illustrating a method for providing information through a messenger in a user device according to an embodiment of the present disclosure.

Referring to FIG. 6, the control unit 170 may execute a messenger and may display the executed messenger in operation 601. For example, the control unit 170 may execute the relevant messenger and may display an execution screen related to the executed messenger, in response to a request from the user.

The control unit 170 may sense a text input event in a state of executing the messenger in operation 603. For example, the control unit 170 may receive text entered by the user or may receive text from at least one conversation partner. The control unit 170 may distinguish a transmission side from a reception side in a conversation (e.g., text entered by the user and text entered by the conversation partner) exchanged between the user and the conversation partner, and may separately display text on the transmission side and text on the reception side by using a speech bubble 20.

When the text input event has been sensed, the control unit 170 may sense the input text in operation 605. For example, the control unit 170 may sense text (e.g., characters, a word, a word sequence, etc.) matched to particular content through text sensing in a conversation (chatting) exchanged through the messenger. For example, the control unit 170 may detect text related to the particular content (e.g., broadcast content, movie content, food content, sightseeing (travel) content, recording content, game content, etc.) in the conversation. According to an embodiment of the present disclsoure, the control unit 170 may sense text, which is based on a natural language used in the conversation (chatting), through character recognition. The term "natural language" refers to a concept enabling people to distinguish a language that people commonly use from an artificial language (or a machine language) which has been artificially invented.

Then, the control unit 170 may analyze a mapping relation between the sensed text and preset text, and may determine whether there exist content related to the sensed text. Here, the control unit 170 may operate so as to recognize only text corresponding to a word/meaning related to particular content (or information) that the user has set. According to various embodiments of the present disclsoure, text sensing may be set so as to sense only text entered by the user, so as to sense only text received from the conversation partner, or so as to sense both the text entered by the user and the text received from the conversation partner.

When the particular content has been identified through the text sensing, the control unit 170 may extract a content image related to the text (particularly, content) and may display the extracted content image in operation 607. According to an embodiment of the present disclsoure, the content image may be provided as a background screen in an intermediate layer between the original background 10 of the messenger and the speech bubble 20.

In a state of displaying the content image, the control unit 170 may receive a user input related to the content image in operation 609. For example, the user may select (i.e., touch)

the content image in order to receive information by using the relevant content image displayed as the background of the messenger.

When the content image has been selected, the control unit 170 may determine the type of the content in operation 611. For example, the control unit 170 may identify an information providing scheme for providing information related to the relevant content. According to various embodiments of the present disclosure, examples of the type of content (i.e., the information providing scheme) may include the execution of an internal application, connecting to an external server and displaying a website, connecting to an external server and displaying a result of making a search on a portal site, acquiring and displaying a coupon, and the like. In this regard, the content types may be variously implemented.

The control unit 170 may control the execution of an operation related to the content in operation 613. For example, the control unit 170 may operate so as to execute a function matched to the type of content in response to the user input selecting the content image. Examples of this operation are illustrated in FIGS. 2D, 3D, 4D and 5D.

Figure 7:
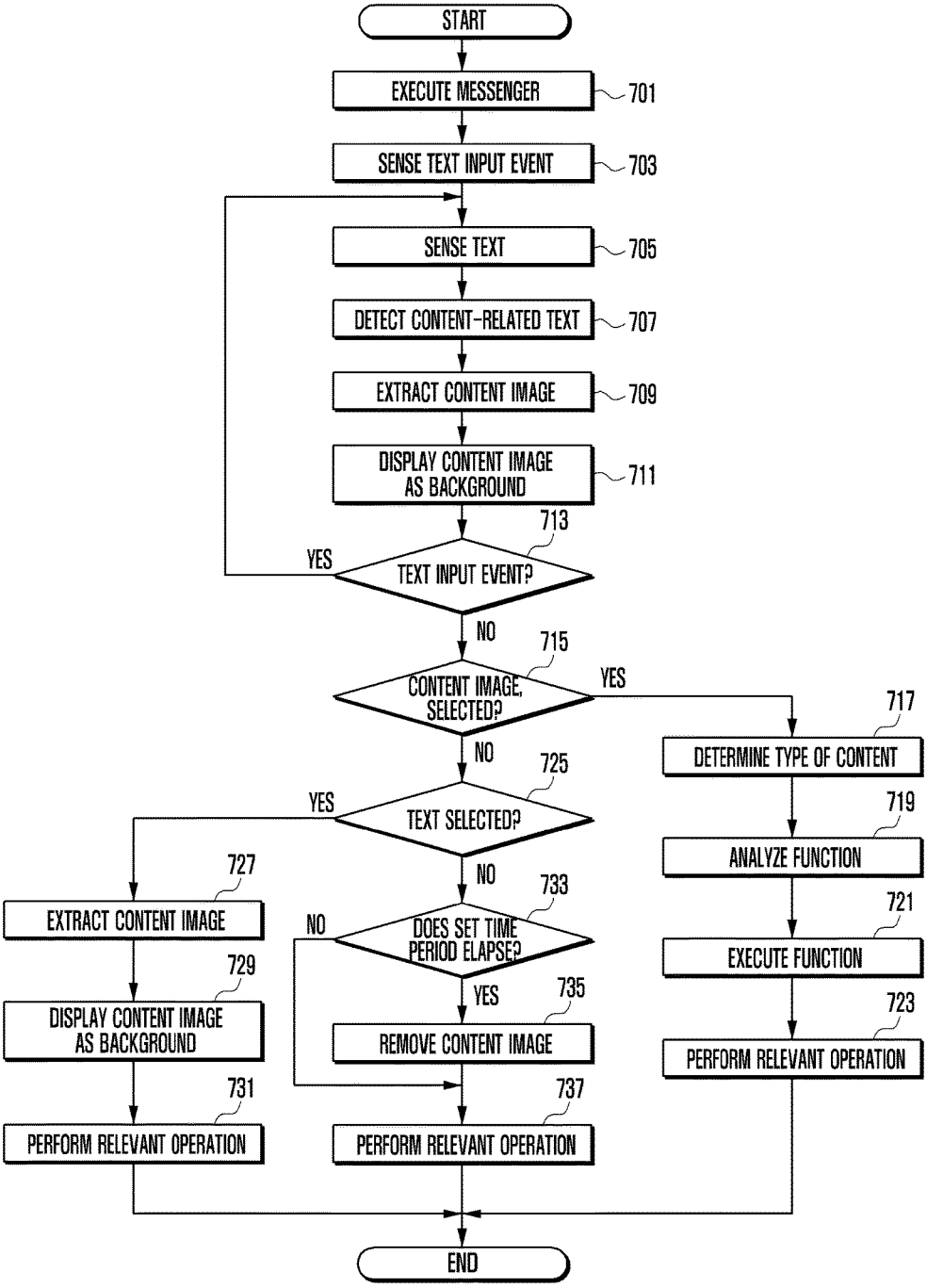
FIG. 7 is a flowchart illustrating a method for providing information through a messenger in a user device according to an embodiment of the present disclosure.

FIG. 7 is a flowchart illustrating a method for providing information through a messenger in a user device according to an embodiment of the present disclosure.

Referring to FIG. 7, the control unit 170 may execute the messenger in response to a user input in operation 701, and may sense a text input event in a state of executing the messenger in operation 703.

When the text input event has been detected, the control unit 170 may sense input text in operation 705. According to various embodiments of the present disclsoure, a target user matched to text to be sensed may be set so as to sense at least one of text received from a conversation partner and text entered by the user, depending on the user's setting.

The control unit 170 may detect content-related text by sensing the text in operation 707. For example, the control unit 170 may analyze a mapping relation between the sensed text and preset text, and may determine whether there exists content related to the sensed text.

When the text matched to particular content has been detected, the control unit 170 may extract a content image related to the text (particularly, content) in operation 709. In operation 711, the control unit 170 may display the extracted content image as a background. According to an embodiment of the present disclsoure, the content image may be provided as a background screen in an intermediate layer between the original background 10 of the messenger and the speech bubble 20.

After displaying the content image, the control unit 170 may determine whether a text input event exists in operation 713. When the text input event is sensed (Yes in operation 713), the control unit 170 may proceed to operation 705, and may control the execution of an operation which follows. When the text input event is not sensed (No in operation 713), the control unit 170 may determine whether the content image is selected, in operation 715.

When the content image is selected in a state of displaying the content image as the background (Yes in operation 715), the control unit 170 may determine the type of content in operation 717, and may analyze a function according to the determined type in operation 719. For example, the control unit 170 may identify an information providing scheme for providing information related to the relevant content. Then, the control unit 170 may execute an internal function or a function of operating in cooperation with the outside, according to the identified information providing scheme, and may operate so as to display information related to content of the text, according to the executed function. In an embodiment of the present disclsoure, the internal function may include a function of executing an internal application installed in the user device and providing information related to content. Examples of the function of operating in cooperation with the outside may include a function of connecting to an external server and displaying a website of information related to content, a function of connecting to an external server and displaying a result of searching for information related to content on a portal site, a function of connecting to an external server before acquiring a coupon related to content and displaying the acquired coupon by using the speech bubble 20, and the like.

The control unit 170 may execute the analyzed function in operation 721, and may control performing a relevant operation according to the executed function in operation 723. For example, the control unit 170 may execute the relevant function in response to the user input selecting the content image, and may perform the operation according to the user input through the function executed as described in each of the examples illustrated in FIGS. 2D, 3D, 4D and 5D.

When the content image is not selected in the state of displaying the content image as the background (No in operation 715), the control unit 170 may determine whether text of the particular speech bubble 20 is selected in operation 725.

When the text of the particular speech bubble 20 is selected (Yes in operation 725), the control unit 170 may identify content mapped to the selected text and may extract a content image matched to the identified content in operation 727. Then, the control unit 170 may display the extracted content image as a background in operation 729, and may control performing a relevant operation in operation 731. For example, the control unit 170 may perform an operation of providing relevant information in response to a user input selecting a content image newly displayed as a background. Alternatively, the control unit 170 may perform the previous procedure in response to a user input selecting text of another speech bubble 20. Alternatively, when a user input is not detected until a set time period elapses, the control unit 170 may perform an operation of removing the display of the content image as the background, and the like.

When the text of the particular speech bubble 20 is not selected (No in operation 725), the control unit 170 may determine whether a preset time period elapses in operation 733. For example, the control unit 170 may count the set time period (e.g., 5 sec., 10 sec., 15 sec., etc.) from a time point of displaying the content image, and may operate so as to display a content image during the set time period.

When the set time period does not elapse (No in operation 733), the control unit 170 may control performing a relevant operation in operation 737. For example, the control unit 170 may wait for a user input in a state of maintaining the display of the content image, and may perform, in response to the user input, an operation of displaying information related to content, an operation of displaying a new content image according to the selection of new text, an operation of receiving new text as input, and the like.

When the set time period elapses (Yes in operation 733), the control unit 170 may remove the content image being displayed as the background in operation 735, and may control performing a relevant operation in operation 737. For example, when the set time period elapses, the control unit 170 may remove the display of the content image as the background, and may operate so as to expose the original background 10. Alternatively, in a state of removing the content image, the control unit 170 may proceed to operation 703 and may perform an operation that follows, as described above, or may terminate the messenger in response to a user input.

Meanwhile, according to various embodiments of the present disclosure, each module may be implemented is software, firmware, hardware, or a combination thereof Also, some or all modules may be implemented in one entity, and a configuration may be implemented in which a function of each relevant module may be identically performed. According to the various embodiments of the present disclosure, operations may be performed sequentially, repeatedly, or in parallel. Further, some operations may be omitted or other operations may be added and executed.

The above-described various embodiments of the present disclosure may be implemented in the form of program instructions executable through various computer means, and may be recorded in a computer-readable recording medium. The computer-readable recording medium may include a program instruction, a data file, a data structure, and the like, individually or in a combination thereof The program instructions recorded in the recording medium may be specially designed and configured for the present disclsoure, or may be known to and usable by those skilled in the field of computer software.

Examples of the computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices, such as a ROM, a RAM, a flash memory and the like, which are specially configured to store and execute program instructions. Also, examples of the program instructions may include a machine language code created by a compiler and a high-level language code executable by a computer by using an interpreter or the like. The above-described hardware device may be configured to operate as one or more software modules in order to perform an operation of the present disclosure, and vice versa.

Also, the various embodiments of the present disclosure disclosed in this specification and the accompanying drawings are merely particular examples provided in order to clearly describe the technical contents of the present disclsoure and help in an understanding of the present disclosure, and are not intended to limit the scope of the present disclosure. Accordingly, the scope of the present disclosure should be construed as including all modifications or changes in form, which may be made based on the technical idea of the present disclosure, as well as the various embodiments disclosed herein.

As described above, the method and the apparatus for providing information by using a messenger, which the present disclosure proposes, can provide useful information to the users based on the text of a conversation exchanged between the users through the messenger of the user device. According to various embodiments of the present disclosure, the user device can detect a word/meaning of text entered by the user or conversation partner while the user chats with the at least one conversation partner by using the messenger. According to various embodiments of the present disclosure, the user device can extract a content image related to the word/meaning detected during the chatting, and can provide information related to the content image (or related to the text) in response to a user input related to the extracted content image.

Accordingly, the user can receive the feedback of various pieces of information useful for the user simultaneously with the use of the messenger. Also, the user is provided with various pieces of useful information, various useful advertisements and the like through a conversation window of the messenger, so that an advertising effect can be maximized and accessibility to information by the user can be improved. Further, according to various embodiments of the present disclosure, the user can set the information providing apparatus so as to filter only text having a word/meaning related to content (or information) that the user desires, and thereby can be selectively provided with information.

Therefore, according to various embodiments of the present disclsoure, the implementation of an optimal environment for providing useful and convenient recommendation information to the user in the user device can contribute to improving the convenience of the user and a developer and improving the usability, convenience and competitiveness of the user device. The above-described various embodiments of the present disclsoure can be implemented by the user devices of all forms, such as a mobile communication terminal, a smart phone, a tablet PC and a PDA, and by various devices each of which can support a function of providing information by using the messenger according to various embodiments of the present disclsoure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing information through a messenger in a user device, the method comprising:

displaying, [by] *on* a display of the user device *by a processor of the user device*, a speech window including [a conversation exchanged through] *a message received from an external device and/or a message sent to the external device in* the messenger and a background image of the messenger, the background image being displayed on a background layer of the messenger, wherein the speech window is displayed on a speech layer of the messenger;

detecting, based on a scheme, by a processor of the user device, text [related to a particular content in the conversation] *included in the received message*;

*determining whether the detected text includes one of key words associated with one or more content images;*

*identifying a content image among the one or more content images corresponding to the key word in the detected text of the received message; and* displaying, by the display of the user device, [a content image matched to the particular content, as a background screen] *the identified content image* in an intermediate layer [which is generated] between the background layer [on which the background image is displayed and the speech layer on which the speech window is displayed,] *and the speech layer of the messenger,* in response to the detecting of the text relating to the [particular content] *identified content image*;

*receiving a user input corresponding to a selection of the identified content image;* and providing, by the processor of the user device, information related to the [particular content] *identified content image* in response to *the* selection of the *identified* content image, wherein the *identified* content image is selectable by a touch input, wherein all of the speech window is displayed and at least part of the *identified* content image and at least part of the background image is covered by the speech window during the displaying of the *identified* content image, and wherein the providing of the information related to the [particular content] *identified content image* comprises:

determining a type of the [particular content when] *identified content image in response to a selection of* the *identified* content image [has been selected], executing an internal function or an external function operating in cooperation with the user device according to the type of the [particular content] *identified content image*, and displaying the information related to the [particular content] *identified content image* according to the executed internal or external function.

2. The method of claim 1, wherein the detecting of the text [related to the particular content] comprises detecting the text related to the content in text that the user inputs into the messenger.

3. The method of claim 1, wherein the detecting of the text [related to the particular content] comprises detecting the text related to the content in text that the messenger receives from a conversation partner.

4. The method of claim 1, wherein the detecting of the text [related to the particular content] comprises detecting the text related to the content in text that the user inputs into the messenger and text that the messenger receives from a conversation partner.

5. The method of claim 1, wherein the displaying of the content image [matched to the particular content] comprises displaying the content image during a preset time period.

6. The method of claim 1, wherein the detecting of the text [related to the particular content] comprises:

receiving a user input selecting text of a conversation which is previously input; and recognizing a content matched to the selected text in response to the user input.

7. The method of claim 1, [wherein the determining of the type of the particular content comprises] *further comprising:* identifying an information providing scheme for providing information related to the [particular content] *identified content image*.

8. The method of claim 1, wherein the internal function includes a function of executing an application of the user device and providing the information related to the [particular content] *identified content image*.

9. The method of claim 1, wherein the external function operating in cooperation with the user device comprises at least one of:

a function of connecting to an external server and displaying a website of the information related to the [particular content] *identified content image*;

a function of connecting to an external server and displaying a result of searching for the information related to the [particular content] *identified content image* on a portal site; or a function of connecting to an external server before acquiring a coupon related to the [particular content] *identified content image* and displaying the acquired coupon.

10. The method of claim 1, [wherein the providing of the information comprises] *further comprising:* displaying the information related to the [particular content] *identified content image* by using a speech window.

[11. The method of claim 1, wherein the scheme includes a mapping table scheme, a semantic analysis scheme, or an ontology scheme.]

12. A user device comprising:

a touch screen display configured to:

display a speech window including [a conversation exchanged through] *a message received from an external device and/or a message sent to the external device in* a messenger and a background image of the messenger, the background image being displayed on a background layer of the speech window of the messenger, wherein the speech window is displayed on a speech layer of the messenger, and receive an input; and a processor configured to:

detect, based on a scheme, text [related to a particular content in the conversations] *included in the received message*,

*determine whether the detected text includes one of key words associated with one or more content images,*

*identify a content image among the one or more content images corresponding to the key word in the detected text of the received message, and* perform a control operation for displaying [a content image matched to the particular content as a background screen] *the identified content image* in an intermediate layer [which is generated] between the background layer [on which the background image is displayed and the speech layer on which the speech window is displayed,] *and the speech layer of the messenger,* in response to the detecting of the text [relating to the particular content] *included in the received message*; and perform a control operation for [displaying] *providing* information related to the [particular content] *identified content image* in response to a selection of the content image, wherein the content image is selectable by a touch input, wherein all of the speech window is displayed and at least part of the content image and at least part of the background image is covered by the speech window during the displaying of the *identified* content image, and wherein the providing of the information related to the [particular content] *identified content image* comprises:

determining a type of the [particular content when] *identified content image in response to a selection of* the content image[has been selected], executing an internal function or an external function operating in cooperation with the user device according to the type of the [particular content] *identified content image*, and displaying the information related to the [particular content] *identified content image* according to the executed internal or external function.

13. The user device of claim 12, wherein the processor is further configured to:

analyze a type of the [particular content] *identified content image* in response to a user input selecting the content image, execute a function matched to the analyzed type of the [particular content] *identified content image*, and provide the information related to the [particular content] *identified content image* through the executed function.

14. The user device of claim 12, wherein the processor is further configured to display the content image during a preset time period.

15. The user device of claim 12, wherein the scheme includes a mapping table scheme, a semantic analysis scheme, or an ontology scheme.

16. A non-transitory computer-readable recording medium storing a program [for performing displaying, by a display of a user device, a speech window including a conversation exchanged through a messenger and a background image of the messenger, the background image being displayed on a background layer of the messenger, wherein the speech window is displayed on a speech layer of the messenger;

detecting, based on a scheme, by a processor of the user device, text related to a content in the conversation;

displaying, by the display of the user device, a content image matched to the particular content as a background screen in an intermediate layer which is generated between the background layer on which the background image is displayed and the speech layer on which the speech window is displayed, in response to the detecting of the text relating to the particular content; and providing, by the processor of the user device, information related to the particular content in response to selection of the content image, wherein the content image is selectable by a touch input, and wherein all of the speech window is displayed and at least part of the content image and at least part of the background image is covered by the speech window during the displaying of the content image, and wherein the providing of the information related to the particular content comprises:

determining a type of the particular content when the content image has been selected, executing an internal function or an external function operating in cooperation with the user device according to the type of the particular content, and displaying the information related to the particular content according to the executed internal or external function] *that, when executed by a processor of an electronic device, causes the processor of the electronic device to execute the method of claim 1.*

17. The non-transitory computer-readable recording medium of claim 16, wherein the scheme includes a mapping table scheme, a semantic analysis scheme, or an ontology scheme.

*18. The user device of claim 12, wherein the processor is further configured to, in response to a user selection of text included in a speech bubble of the speech window:*

*recognize content matched to the user-selected text,*

*display the recognized content in the intermediate layer, and*

*provide, in response to user selection of the recognized content, relevant information related to the recognized content.*

* * * * *